United States Patent [19]
Fujiwara et al.

[11] Patent Number: 5,729,517
[45] Date of Patent: Mar. 17, 1998

[54] DATA DETECTING CIRCUIT

[75] Inventors: Tsuneo Fujiwara, Nara; Tomiyuki Numata, Tenri, both of Japan

[73] Assignee: Sharp Kabushiki Kaisha, Osaka, Japan

[21] Appl. No.: 740,308

[22] Filed: Oct. 28, 1996

[30] Foreign Application Priority Data

Oct. 30, 1995 [JP] Japan ................................. 7-281519
Jun. 25, 1996 [JP] Japan ................................. 8-164191

[51] Int. Cl.$^6$ ................................................ H04N 5/76
[52] U.S. Cl. ...................................................... 369/59
[58] Field of Search ........................... 369/124, 59, 54, 369/47, 49, 48

[56] References Cited

U.S. PATENT DOCUMENTS

| | | | |
|---|---|---|---|
| 5,311,523 | 5/1994 | Serizawa et al. | 371/43.6 |
| 5,341,387 | 8/1994 | Nguyen | 371/43.7 |
| 5,600,664 | 2/1997 | Hayashi | 369/60 |

FOREIGN PATENT DOCUMENTS 6-243598   2/1994   Japan .

OTHER PUBLICATIONS

Viterbi Detection of Partial Response on a Magneto–Optical Recording Channel, M. Tobita et al., SPIE vol. 1663, Optical Data Storage (1992), pp. 166–173.

"A Study on PRML Detection in Magneto–Optical Recording Systems"; T. Fujiwara et al.; Spring 1993; C–474, pp. 5–104.

"Performance Estimeitiion of PRML in High Density Optical Magnetic Recording Channel"; M. Kobayashi et al.; General Meeting 1995, C–468; p. 60.

"A Study on PRML Systems in Magneto–Optical Recording"; H. Osawa et al.; General Meeting 1995, C–469; p. 61.

Primary Examiner—Nabil Hindi

[57] ABSTRACT

A clock extracting section generates a first clock synchronized with a reproducing signal, and a second clock with a frequency twice a frequency of the first clock. An AD converter quantizes the reproducing signal at timing of the second clock. A data classifier classifies the quantized data into two quantized data streams with a period of the first clock. Each equalizer equalizes the two quantized data streams to (1,1) and (1,2,1) partial response characteristics. Each branch metric arithmetic unit calculates a corresponding branch metric respectively. A synthesizer calculates a sum of them so as to generate a synthetic branch metric. An ACS circuit and a data decoding section Viterbi-decode data according to the synthetic branch metric. As a result, even if an SN ratio is lowered by increase in interference between codes and a noises at the time of recording at high density, an error of decoded data can be decreased.

21 Claims, 26 Drawing Sheets

RECODING / EXPECTED
DATA / VALUE

RECODING DATA / EXPECTED VALUE

RECODING DATA / EXPECTED VALUE

FIG. 19

| DATA WORD | PREVIOUS CODE WORD | CODE WORD |
|---|---|---|
| 1 0 0 X | 0 | → 1 0 1 |
| 1 0 1 X | 0 | → 0 1 0 |
| 1 1 0 0 | 0 | → 0 1 0 |
| 1 1 $\overline{0\ 0}$ | 0 | → 1 0 0 |
| 0 0 0 X | 0 | → 0 0 1 |
| 0 0 1 X | 0 | → 0 0 0 |
| 0 1 0 X | 0 | → 0 0 1 |
| 0 1 1 X | 0 | → 0 0 0 |
| 0 0 0 X | 1 | → 0 0 1 |
| 0 0 1 X | 1 | → 0 1 0 |
| 0 1 0 0 | 1 | → 0 1 0 |
| 0 1 $\overline{0\ 0}$ | 1 | → 0 0 0 |

X: Don't Care
$\overline{00}$: 01 or 10 or 11

FIG. 20

| DATA WORD | CODE WORD |
|---|---|
| 1 0 | → 0 1 0 0 |
| 0 1 0 | → 1 0 0 1 0 0 |
| 0 0 1 0 | → 0 0 1 0 0 1 0 0 |
| 1 1 | → 1 0 0 0 |
| 0 1 1 | → 0 0 1 0 0 0 |
| 0 0 1 1 | → 0 0 0 0 1 0 0 0 |
| 0 0 0 | → 0 0 0 1 0 0 |

RECORDING DATA / EXPECTED VALUE

RECORDING DATA / EXPECTED VALUE

DATA DETECTING CIRCUIT

FIELD OF THE INVENTION

The present invention relates to a data detecting circuit which is suitable for detecting a reproducing signal of an optical disk, for example, and Viterbi-decodes data from a signal including a data stream, more particularly, a data detecting circuit which is capable of decoding data at a low data error rate.

BACKGROUND OF THE INVENTION

An optical disk has been used as an information recording medium having a large capacity. A technique for recording and reproducing information at higher density is required for increasing a capacity of such an optical disk more.

As a data detecting circuit for a reproducing signal of an optical disk where information has been recorded at high density, a data detecting circuit for equalizing a reproducing signal to a PR(1,1) characteristic and maximumly decoding the equalized reproducing signal with Viterbi decoding in two states is known (M. Tobita, "Viterbi Detection of Partial Response on a Magneto Optical Recording Channel"; SPIE Vol. 1663 Optical Data Storage (1992) p 166-p 173).

In addition, as a circuit for reproducing data recorded at higher recording density, a data detecting circuit for equalizing a reproducing signal to a PR(1,2,1) characteristic and decoding data with Viterbi decoding in four states according to the PR(1,2,1) characteristic is known (Japanese Unexamined Patent Publication No. 6-243598/1994 (Tokukaihei 6-243598)).

FIG. 29 is a block diagram which shows a configuration of a conventional data detecting circuit. In FIG. 29, data recorded in an optical disk 101 as a recording medium are converted into an electric signal by an optical pickup 102. Then, the electric signal is inputted into a clock extracting section 103 to which a PLL (Phase Locked Loop) circuit is applied, and a channel clock C1 which is synchronized with a reproducing signal is outputted therefrom. An AD (Analog to Digital) converter 104 quantizes the reproducing signal at timing of the clock C1. The quantized data stream is inputted to an equalizer 106 so as to be equalized to a desired PR characteristic. An output of the equalizer 106 is inputted to a branch metric arithmetic unit 108, and a branch metrics are calculated by using an expected values according to the PR characteristic. Then, the branch metrics are inputted to an addition comparing selection circuit (ACS circuit) 111 so that a survival path is determined. The ACS circuit 111 outputs information about which state transition the survival path is in, and this output is inputted to a data decoding section 112 so as to be decoded therein.

However, in the above-mentioned conventional data detecting circuit, if information is recorded at higher density and thus an SN ratio is reduced due to interference between codes or the SN ratio is reduced due to an increase in noise, an error rate of decoded data is increased.

SUMMARY OF THE INVENTION

It is an object of the present invention to provide a data detecting circuit which is capable of Viterbi-decoding data at a low error rate from a signal representing a data stream such as a reproducing signal of an optical disk.

In order to achieve the above object, a data detecting circuit of the present invention has a data stream generating circuit for quantizing and equalizing the signal at sampling points with different phases so as to generate a plurality of data streams having different partial response characteristics, a branch metric generating circuits for generating branch metrics representing probability of each state transition of the signal based upon the corresponding data stream and the partial response characteristic of the data stream, a branch metric synthesizing circuits for generating synthetic branch metrics corresponding to each state transition based upon the branch metrics generated by the branch metric generating circuit, and a data decoding circuit for Viterbi-decoding data based upon each of the synthetic branch metrics.

In accordance with the above arrangement, when data are decoded, plural types of branch metrics are calculated based upon different partial response characteristics. Moreover, by using a synthetic branch metric generated by a combination of the branch metrics, the data are Viterbi-decoded. The synthetic branch metric is calculated by, for example, an adder for adding various types of the branch metrics.

As a result, a difference in probability between an arbitrary state transition and another arbitrary state transition becomes larger compared with the case where data are Viterbi-decoded based upon one type of a PR characteristic. As a result, at the time of the Viterbi-decoding, since the probability that a wrong path is selected as a maximum likelihood path is decreased, a data error rate of the decoded result can be decreased.

As the above method of generating the branch metrics by the branch metric generating circuit, various methods can be considered. For example, when generating branch metric of each state transition, the branch metric generating circuit may calculate the probability density functions of each state transition as the branch metric. However, in this case, it is necessary for the branch metric synthesizing circuit to generate a synthetic branch metric from the product of plural kinds of the branch metrics, so this method is not practical.

Therefore, it is more preferable that each of the branch metric generating circuits generates each of the branch metrics based upon a logarithm of the probability density function of each state transition. More concretely, it is preferable that the branch metric is calculated based upon a difference between $2X \cdot Dx$ and $Dx^2$ when a size of the data received from the data stream generating circuit is represented by X and the expected value of the state transition corresponding to the branch metric is represented by Dx. In this case, each synthetic branch metric becomes the sum of plural kinds of the branch metrics. As a result, the branch metric synthesizing circuit can be realized by a simple circuit such as an adder for adding plural kinds of branch metrics.

In addition, if the error rates of the branch metrics calculated from each data stream are different from each other, in addition to the above arrangement, it is preferable that a weighting circuit is provided correspondingly to at least one data stream. The weighting circuit weights each branch metric calculated from the data stream according to the PR characteristics of the data stream. Here, the weighting circuit is composed of a simple circuit such as multipliers.

In accordance with the above arrangement, as the data error rate in the case where a plurality of data streams are Viterbi-decoded independently becomes lower, the larger weight is applied to the branch metrics and thus the branch metric synthesizing circuit can synthesize the branch metrics. As a result, in the case where the S/N ratio of the signal is lowered, such as the case where the recording density of the recording medium is increased, even if the data error rate from the branch metric according to the PR characteristic with less state is increased, the branch metric synthesizing circuit can generate the most suitable synthetic branch metric. As a result, the data detecting circuit can decode data at more satisfactory error rate.

When the data detecting circuit having the above configuration is used, the data can be decoded at lower error rate than a conventional technique. Therefore, the data detecting circuit is suitable for detecting data from a reproducing signal of a recording medium where high density recording is executed. In general, when the recording density of the recording medium is increased, the S/N ratio of the reproducing signal is lowered due to the interference between codes, the data error rate becomes high. However, the data can be decoded at satisfactory data error rate even from the reproducing signal whose S/N ratio is lowered by using the data detecting circuit having the above configuration. As a result, the data detecting circuit is extremely effective in improving the recording density of the recording medium. Moreover, even if the recording density and the S/N ratio are the same as the conventional ones, data can be decoded at more satisfactorily error rate than a conventional error rate. As a result, a margin at the time of data detection can be enlarged.

As mentioned above, when the data detecting circuit is used for detecting data from the reproducing signal of the recording medium, in the case where each data stream is Viterbi-decoded independently, the data error rate can be estimated according to the recording density of the recording medium. Therefore, when the recording density of the recording medium varies, in addition to the above arrangement, it is desirable that a detecting circuit for detecting recording density of a recording medium and a weight changing circuit for instructing the weighting circuit to weight the branch metrics according to an instruction of the detecting circuit are provided.

In accordance with the above arrangement, a weighting rate among the data streams can be changed according to the recording density of the data. Therefore, even in the case where data recording density is variable, such as the case where a plural types of recording media with different recording density are used and the case where reproduction is executed from a recording medium whose recording density is different with a data reproducing position such as a radial position, the branch metric synthesizing circuit can always generate the most suitable synthetic branch metric. As a result, the data detecting circuit can detect data at lower error rate.

For fuller understanding of the nature and advantages of the invention, reference should be made to the ensuing detailed description taken in conjunction with the accompanying drawings.

BRIEF DESCRIPTION OF THE DRAWINGS

FIG. 19 is a drawing which shows a typical translation table of a (1,7) RLL code.

FIG. 20 is a drawing which shows a typical translation table of a (2,7) RLL code.

DETAILED DESCRIPTION OF THE PREFERRED EMBODIMENTS

[FIRST EMBODIMENT]

The following describes a data detecting circuit according to first embodiment of the present invention. Here, for concrete explanation, the description will be given as to the case where a quantized data stream is obtained at intervals of channel clocks with different sampling phases by oversampling an inputted signal by a clock having a frequency double a frequency of a channel clock, and the quantized data stream is Viterbi-decoded. Moreover, an optical disk is supposed as a recording medium.

Figure 2:
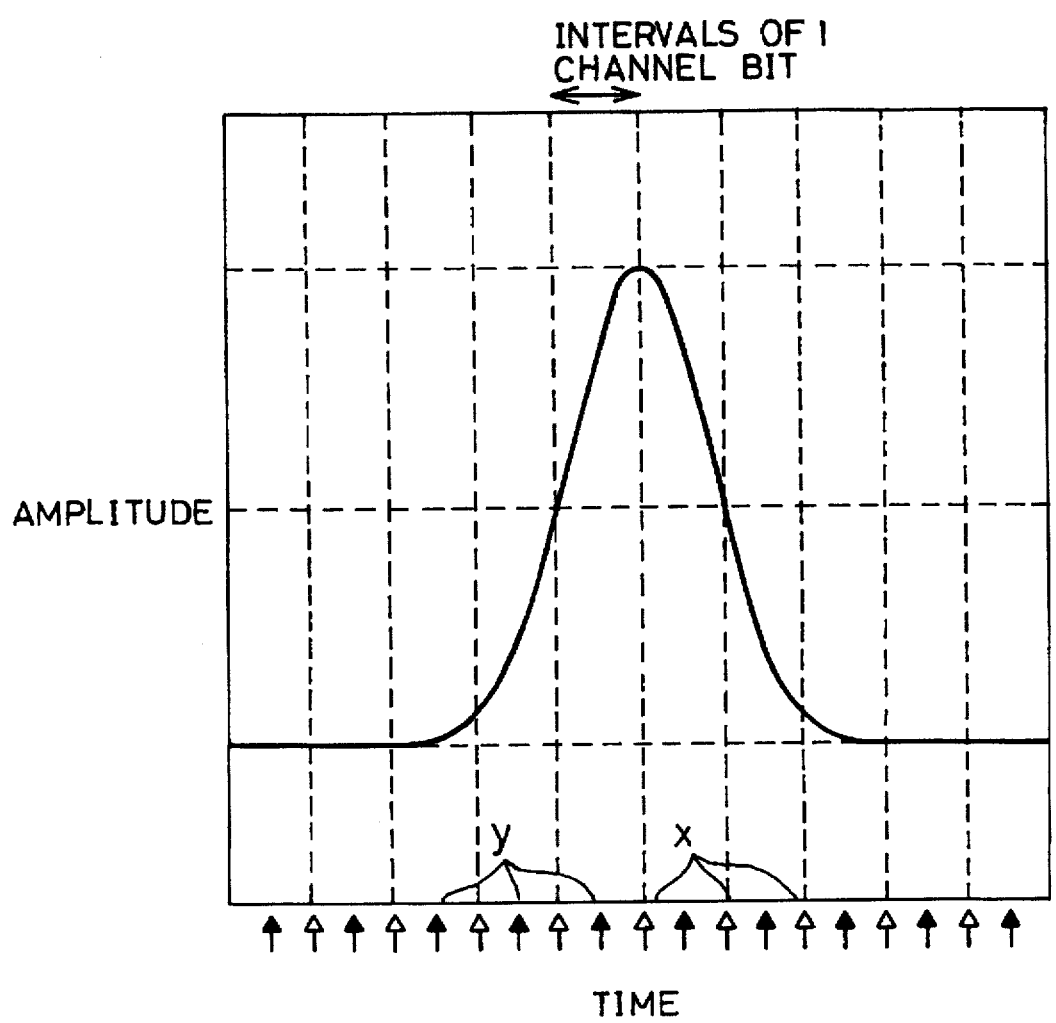
FIG. 2 is a drawing explaining a general idea of the present invention, more specifically, a waveform chart which shows a reproducing signal.

FIG. 2 is a drawing which shows response of a reproducing waveform when a mark with one channel bit (one bit on a recording medium is referred to as one channel bit) is scanned by a beam spot. Hereinafter, the reproducing waveform of one channel bit is referred to as impulse response, and impulse response which was quantized and digitized at a certain timing is referred to as digitized impulse response.

In a detecting method of maximumly decoding data with Viterbi decoding by utilizing a characteristic of PR (hereinafter, referred to as PR characteristic), namely, PRML (Partial Response Maximum Likelihood) detection, a reproducing waveform is sampled by using a clock synchronized with the reproducing waveform at channel bit intervals (i.e. channel clock) and is equalized to a desired PR characteristic so as to be Viterbi-decoded. Therefore, a value at the sampling point is important in the reproducing signal, so values at the other timing are meaningless. When the Viterbi decoding is executed by utilizing a PR(1,2,1) characteristic, for example, as shown by the impulse response in FIG. 2, a reproducing signal is quantized at timing represented by outline arrows (i.e. phase x), and is equalized to the PR(1,2,1) characteristic so as to be Viterbi-decoded. Moreover, when the Viterbi decoding is executed by utilizing a PR(1,1) characteristic, as shown by the impulse response in FIG. 2, a reproducing signal is quantized at timing represented by black arrows (i.e. phase y) and is equalized to the PR(1,1) characteristic so as to be Viterbi-decoded.

As mentioned above, the phases of the timing of quantization are different according to the PR characteristics to be utilized. This is because when a sampling phase is selected so that digitized impulse response at the time of quantization at that timing is close to the respective PR characteristic, a burden of the equalization process is decreased, and the data error rate is decreased.

The present invention provides a decoding method which is superior to a conventional method. In such a decoding method, a branch metric is obtained according to the digitized impulse response with a plurality of the sampling phases from a reproducing signal by utilizing such a property that when the sampling phase is changed, the digitized impulse response is changed, so that Viterbi decoding is executed based upon the obtained branch metric.

Figure 1:
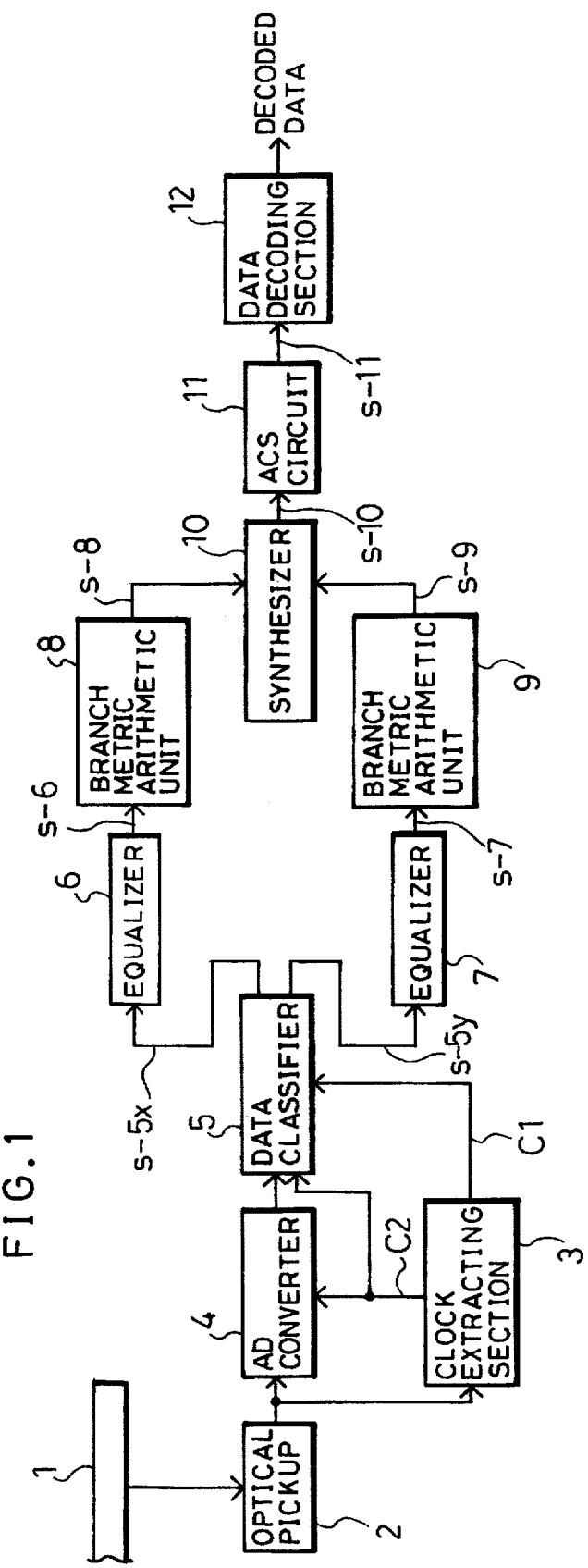
FIG. 1 is a block diagram which shows a configuration of a data detecting circuit according to one embodiment of the present invention.

FIG. 1 is a block diagram which shows a data detecting circuit of the present invention. In FIG. 1, data recorded in an optical disk 1 as a recording medium are converted into an electric signal by an optical pickup 2. Then, the electric signal is inputted into a clock extracting section (clock generating means) 3 to which a PLL circuit (Phase Locked Loop) is applied, and a clock C1 (first clock) having the same frequency as a frequency of a channel clock synchronized with a reproducing signal and a clock C2 (second clock) having a frequency twice a frequency of the channel clock synchronized with the reproducing signal are outputted from the clock extracting section 3. An AD converter (Analog to Digital Converter; quantizing means) 4 quantizes the reproducing signal at timing of the clock C2.

Meanwhile, a data classifier (classifying means) 5 classifies the quantized data alternately at timing of the clocks C1 and C2 outputted from the clock extracting section 3 so as to output the classified data as two data streams s-5x and s-5y. The two data streams s-5x and s-5y are inputted respectively to equalizers 6 and 7, and are equalized to desired PR characteristics. The outputs s-6 and s-7 of the equalizers 6 and 7 are inputted respectively to branch metric arithmetic units (branch metric generating means) 8 and 9, and branch metrics are calculated by using expected values according to the respective PR characteristics. The branch metrics s-8 and s-9 calculated by the branch metric arithmetic units 8 and 9 are synthesized into one branch metric by a branch metric synthesizer (branch metric synthesizing means) 10. In each drawing, the branch metric synthesizer is referred to as the synthesizer 10. The synthetic branch metric s-10 is inputted into an addition comparing selection circuit (ACS circuit) 11, and a survival path is determined based upon the branch metric s-10. The ACS circuit 11 outputs information about which state transition the survival path is in, and this output s-11 is inputted into a data decoding section 12 so as to be decoded therein. The ACS circuit 11 and the data decoding section 12 are designed so as to be suited to one of the two PR characteristics in which a number of states is larger.

The data stream generating means in claim is composed of the AD converter 4, the clock extracting section 3, the data classifier 5, and the equalizers 6 and 7. The data decoding means is composed of the ACS circuit 11 and the data decoding section 12.

The following describes details of the data detecting circuit having the above configuration. First, the explanation is given as to a decoding principle of the data decoding circuit.

The case where two types of PR characteristics, i.e. PR(1,2,1) and PR(1,1) characteristics are applied to the two quantized data streams in which a sampling phase differs by 180° is considered. This can be realized by quantizing data at sampling timing having a frequency twice a frequency of the channel clock, classifying the data alternately into two data streams, and by equalizing the data streams individually to a desired PR characteristic. In FIG. 1, data are sampled by using the clock C2, the sampled data are classified alternately by the data classifier 5 and are equalized to a desired PR characteristics by the equalizers 6 and 7.

Figure 3:
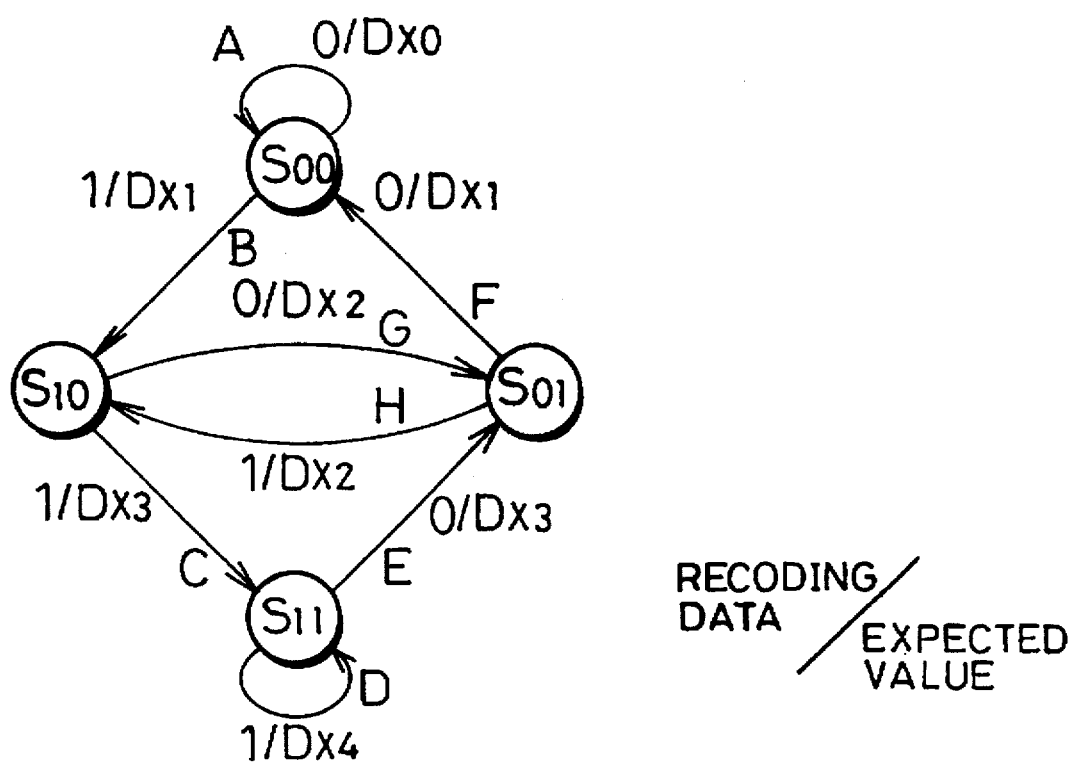
FIG. 3 is a state transition chart of a PR(1,2,1) characteristic.
Figure 4A:
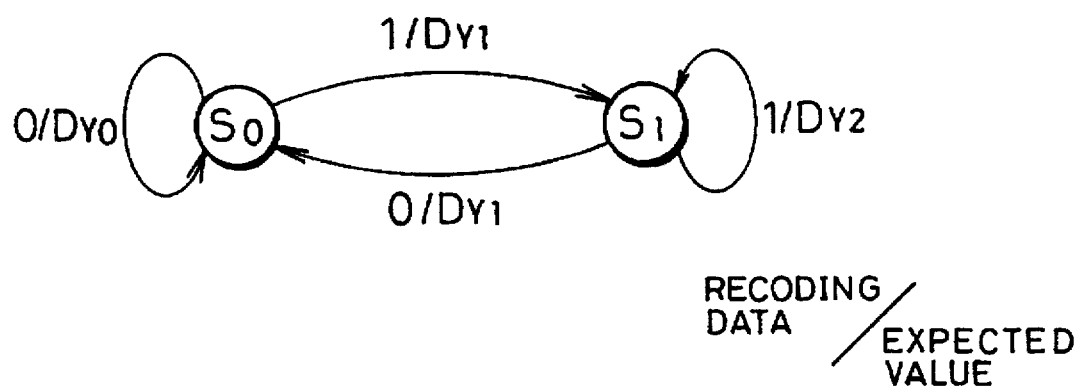
FIG. 4(a) is a state transition chart of a PR(1,1) characteristic.
Figure 4B:
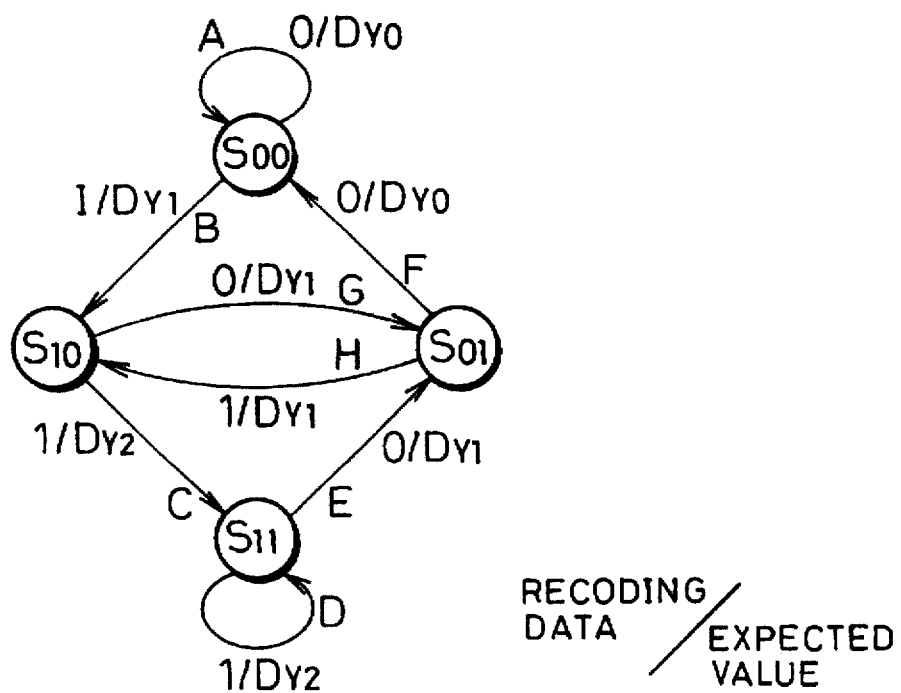
FIG. 4(b) is a state transition chart of the PR(1,1) characteristic which is enlarged to the same number of states as the PR(1,2,1) characteristic.

The sate transition chart of the PR(1,2,1) characteristic is shown in FIG. 3, and the state transition chart of the PR(1,1) characteristic is shown in FIGS. 4(a) and 4(b). The state transition chart of the PR(1,1) is shown by a small number of states as shown in FIG. 4(a), but for clear understanding, as shown in FIG. 4(b), the PR(1,1) is drawn by increasing a number of states to the same number as the PR(1,2,1). As mentioned above, when two PR characteristics are used simultaneously, a PR characteristic with a smaller number of states is enlarged so as to have the same number of states as the PR characteristic with a larger number of states. As a result, the state transition chart becomes more understandable. In these state transition charts, Sxx represents past recording data. For example, S10 represents that 2 bit past is "0", and one bit past is "1". Moreover, alphabet A through H of arrows showing state transition are put for clear understanding when the state transition is explained.

Here, an expected value of the state transition (branch) is considered. The expected value is a value of a reproducing signal when it is supposed that no noise and no equalization error exist. In the case of the PR(1,2,1) characteristic, as shown in FIG. 3, the expected value of each branch is selected from five values ($D_{X0}$ through $D_{X4}$), and in the case of the PR(1,1) characteristic, as shown in FIG. 4(b), the expected value of each branch is selected from three values ($D_{Y0}$ through $D_{Y2}$). These expected values are determined by assuming an output of the AD converter 4 actually. For example, if the output of the AD converter 4 is eight bits, the expected values are determined in a range of 0-255.

Figure 5:
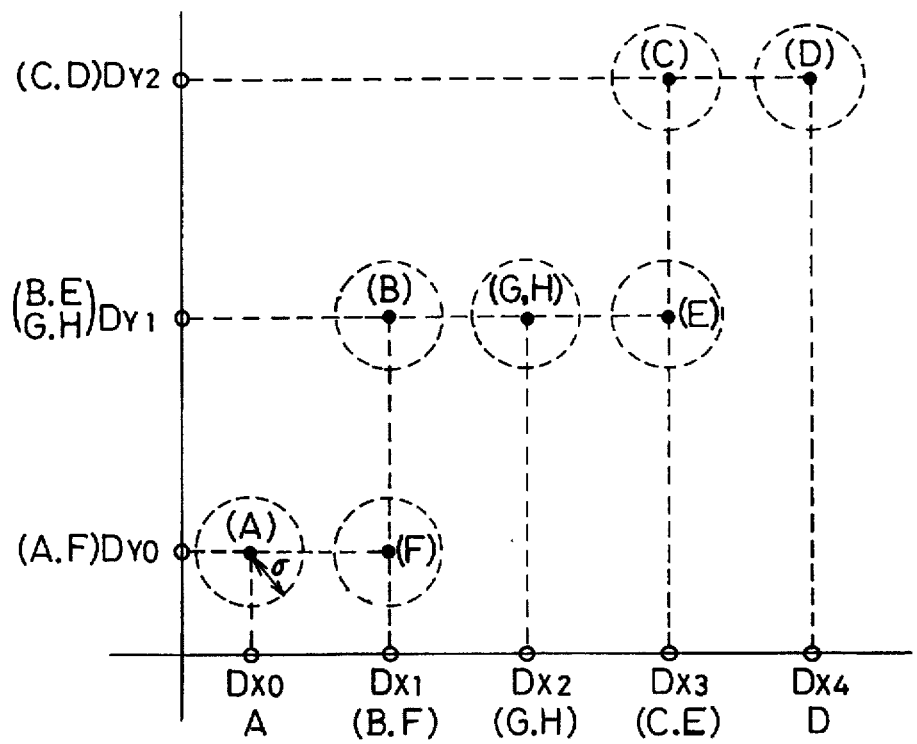
FIG. 5 is a drawing explaining a general idea of the present invention, more specifically, a drawing which shows a relationship between a pair of expected values obtained from two types of PR characteristics and the state transition.

In the present embodiment, since two types of expected values, i.e. an expected value of the PR(1,2,1) characteristic and an expected value of the PR(1,1) characteristic exist for each branch, every time when one bit data are reproduced, two types of paired expected values are calculated. FIG. 5 shows the two types of paired expected values which is represented in a two-dimensional surface where the expected value of the PR(1,1) is represented by the vertical axis and the expected value of the PR(1,2,1) is represented by the horizontal axis. In FIG. 5, alphabets in parentheses correspond to the alphabet put to the state transition in FIGS. 3 and 4(b).

It is found that a distance between arbitrary expected values calculated by a pair of expected values is equal to or larger than a distance between corresponding expected values calculated independently by the PR(1,1) (white dot on the vertical axis) and a distance between corresponding values calculated independently by the PR(1,2,1) (white dot on the horizontal axis). Particularly, the expected values in the state transition A-F, B-E, C-D, B-G, B-H, E-G, and E-H have the same values when the PR(1,1) is used independently, but they have different values when the two PR characteristics are used together. Meanwhile, the expected values in the state transition B-F and C-E have the same value when the PR(1,2,1) is used independently, but have the different values when the two PR characteristics are used together. As a result, it can be considered that a distance between expected values becomes larger.

Quantized data are actually obtained by superimposing a noise on an expected value. Here, a value of the quantized data, which are obtained with respect to a certain expected value can be represented by probability density function. If the noise is a Gaussian distribution white noise N (0, $\sigma^2$), the probability density function can be represented by the following equation.

The probability density function in the case of utilizing the PR(1,2,1) characteristic is:

$$\frac{1}{\sqrt{2\pi}\ \sigma} \exp\left(-\frac{(X-D_X)^2}{2\sigma^2}\right) \quad (1)$$

X: input $D_X$: expected value ($D_{X0}$ through $D_{X4}$)

The probability density function in the case of utilizing the PR(1,1) characteristic is:

$$\frac{1}{\sqrt{2\pi}\ \sigma} \exp\left(-\frac{(Y-D_Y)^2}{2\sigma^2}\right) \quad (2)$$

Y: input $D_Y$: expected value ($D_{Y0}$ through $D_{Y4}$)

In this system, a pair of quantized data with two phases are obtained. If a noise which is superimposed on a pair of the quantized data is N(0,$\sigma^2$), the probability density function of the paired quantized data with respect to a pair of expected values can be represented by the product of the equations (1) and (2) as follows:

$$\frac{1}{\sqrt{2\pi}\ \sigma} \exp\left(-\frac{(X-D_X)^2}{2\sigma^2}\right) \times \frac{1}{\sqrt{2\pi}\ \sigma} \exp\left(-\frac{(Y-D_Y)^2}{2\sigma^2}\right) \quad (3)$$

In FIG. 5, this probability density function is represented by a doted circle whose radius is a standard deviation $\sigma$. In the present embodiment, a distance between expected values calculated from a pair of expected values becomes larger. Moreover, the probability density function is represented by a two-dimensional surface. However, since the standard deviations $\sigma$ are equal, a difference in the probabilities between arbitrary branches (branch metric) becomes large. Therefore, the probability of selecting a wrong path as a maximum likelihood path is decreased, and thus the data error of decoded results is decreased.

The following describes a method of obtaining a branch metric of each branch. Since the branch metric represents a relative value of the probability of each branch, the branch metric can be obtained by taking a logarithm of the probability density function and transforming the logarithm.

First, when a logarithm of the probability density function in the equation (1) is taken and is transformed, the branch metric in the case of utilizing only the PR(1,2,1) characteristic is as follows:

$$\ln\left\{\frac{1}{\sqrt{2\pi}\ \sigma} \exp\left(-\frac{(X-D_X)^2}{2\sigma^2}\right)\right\} \quad (4)$$

$\Rightarrow -(X-D_X)^2$ $\Rightarrow 2X \cdot D_X - D_X^2$

In addition, when a logarithm of the probability density function in the equation (2) is taken and is transformed, the branch metric in the case of utilizing only the PR(1,1) characteristic is as follows:

$$\ln\left\{\frac{1}{\sqrt{2\pi}\ \sigma}\exp\left(-\frac{(Y-D_Y)^2}{2\sigma^2}\right)\right\} \quad (5)$$

$$\Rightarrow -(Y-D_Y)^2$$

$$\Rightarrow 2Y \cdot D_Y - D_Y^2$$

Meanwhile, when a logarithm of the probability density function in the equation (3) is taken and is transformed, the branch metric of the present embodiment is as follows:

$$\ln\left\{\frac{1}{\sqrt{2\pi}\ \sigma}\exp\left(-\frac{(X-D_X)^2}{2\sigma^2}\right)\times \right. \quad (6)$$

$$\left. \frac{1}{\sqrt{2\pi}\ \sigma}\exp\left(-\frac{(Y-D_Y)^2}{2\sigma^2}\right)\right\}$$

$$\Rightarrow -(X-D_X)^2-(Y-D_Y)^2$$

$$\Rightarrow 2X \cdot D_X - D_X^2 + 2Y \cdot D_Y - D_Y^2$$

The equation (6) is equal to the addition of each branch metric in the PR(1,1) characteristic and the PR(1,2,1) characteristic, namely, the equations (4) and (5). Therefore, if a superimposed noise is a Gaussian distribution white noise, in this example, it can be considered that the value of the equation (6) is a branch metric (i.e. the synthetic branch metric), which is obtained by calculating the branch metric of the PR(1,1) and the branch metric of the PR(1,2,1) as usual, and added these branch metrics simply. This means that, according to the block diagram of FIG. 1, the branch metric of the PR(1,2,1) characteristic is calculated by the branch metric arithmetic unit 8, and the branch metric of the PR(1,1) characteristic is calculated by the branch metric arithmetic unit 9, and the calculated branch metrics are added by the branch metric synthesizer 10 so that the synthetic branch metric is calculated. Needless to say, the case where each synthetic branch metric is not obtained after each branch metric of each PR characteristic is calculated, but the synthetic branch metrics are calculated in one section at a time is not out of the scope of the present invention.

The following explains details of the block diagram shown in FIG. 1.

Figure 6:
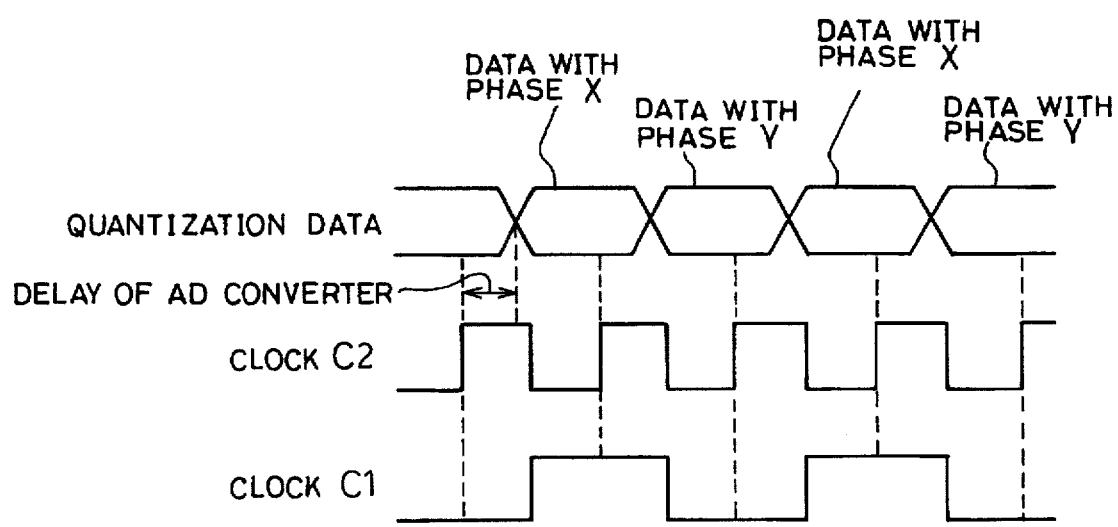
FIG. 6 is a waveform chart which explains an operation of a clock extracting section in the data detecting circuit.

First, an explanation is given as to an operation of the clock extracting section 3. The clock extracting section 3 generates the clocks C1 and C2 using the PLL circuit. FIG. 6 is a drawing which shows timing of the clocks C1 and C2. As shown in this drawing, the clock C2 is set so as to have a frequency twice a frequency of the clock C1. Moreover, when the clock C2 rises while the clock C1 is on a high level, data are quantized with an sampling phase x (PR(1,2,1) characteristic) shown in FIG. 2, and when the clock C2 rises while the clock C1 is on a low level, data are quantized with a sampling phase y (PR(1,1) characteristic).

Figure 7:
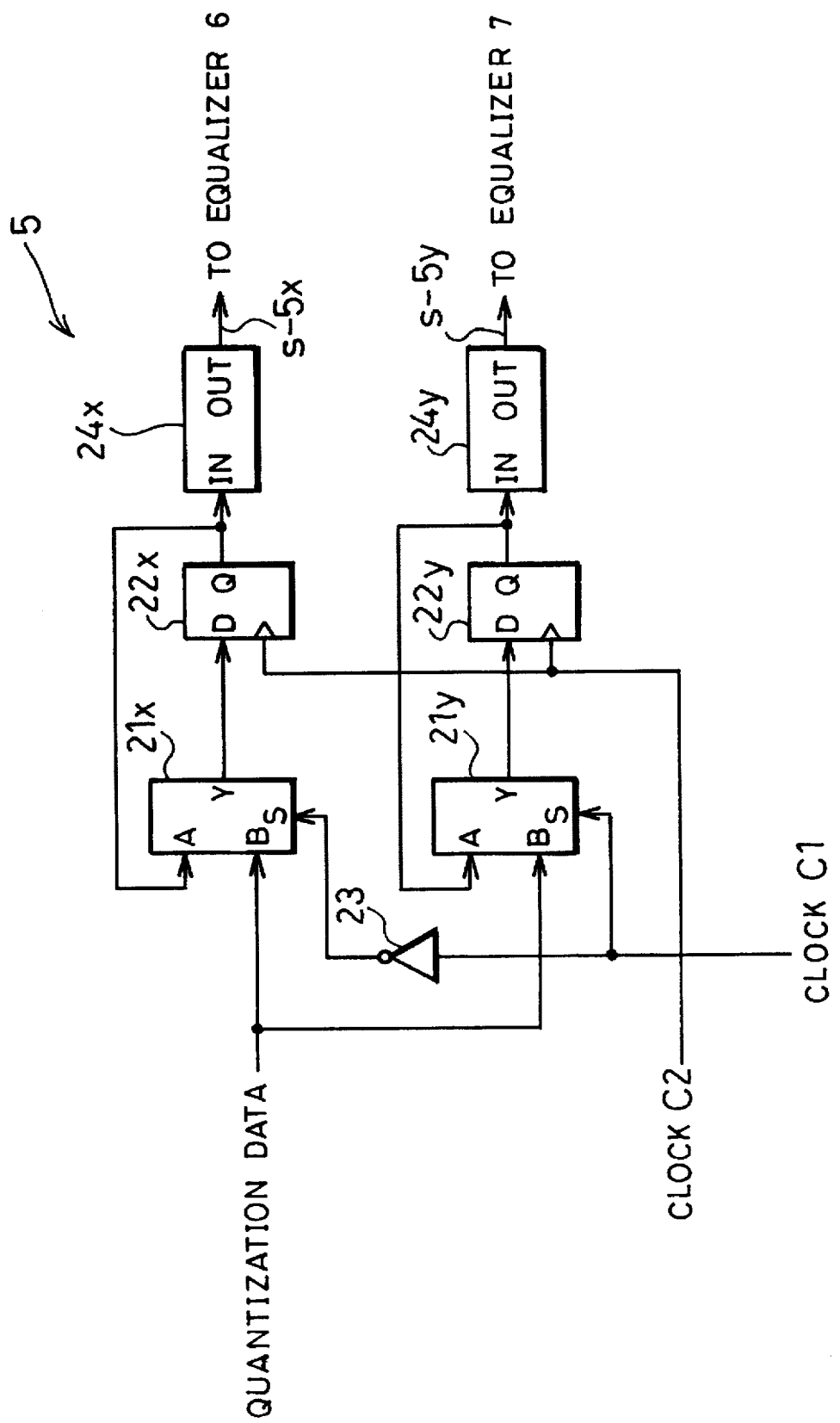
FIG. 7 is a block diagram which shows an arrangement of a data classifier in the data detecting circuit.
Figure 8:
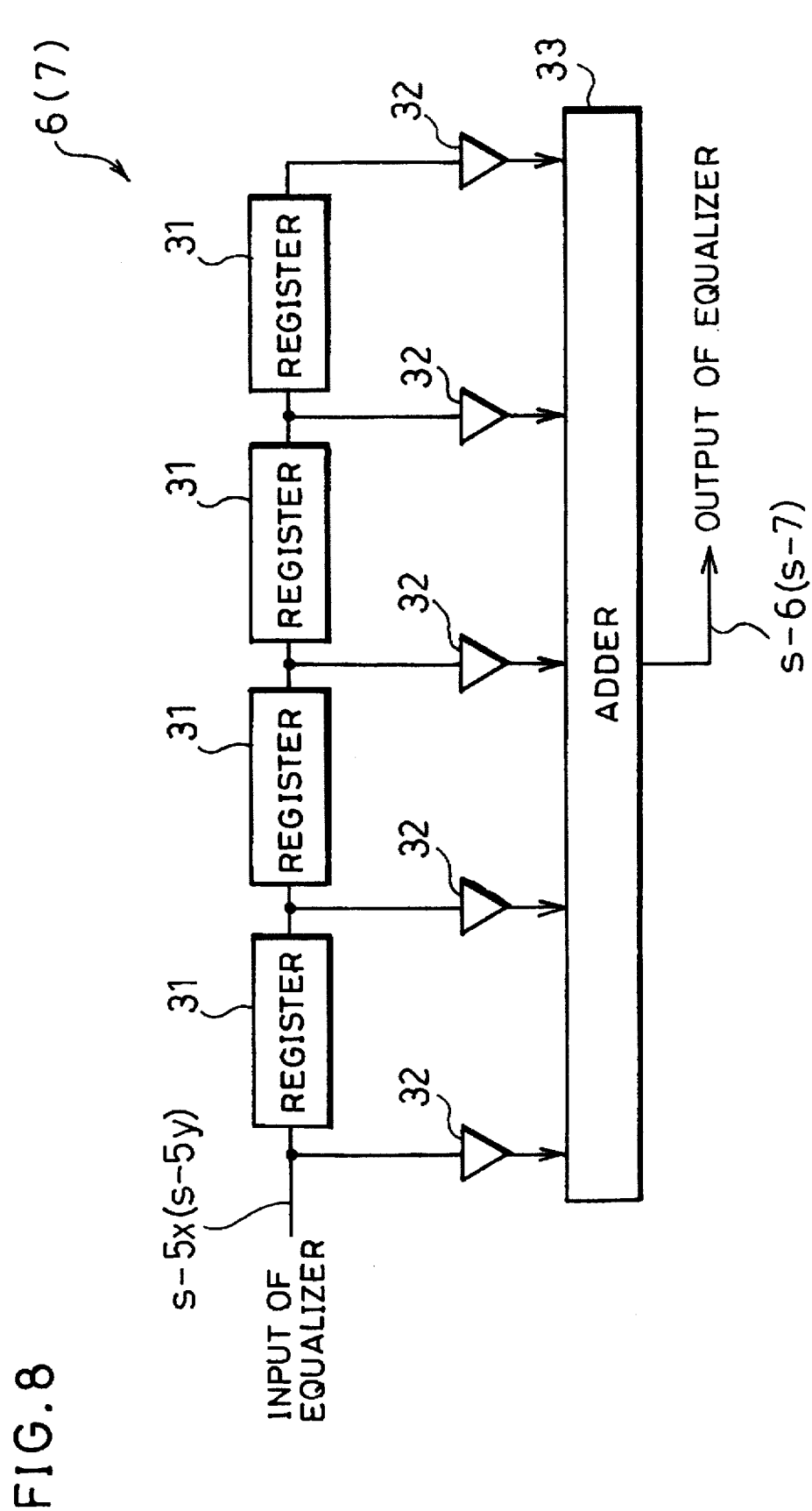
FIG. 8 is a block diagram which shows an arrangement of an equalizer in the data detecting circuit.

Next, an explanation is given as to an operation of the data classifier 5. FIG. 7 is a drawing which shows one arrangement of the data classifier 5. Here, selectors 21x and 21y outputs a value of an input A from an output Y when an input S is on a high level, and outputs a value of the input B when the input S is on a low level. Quantized data are inputted respectively to the inputs B of the selectors 21x and 21y from the AD converter 4. Moreover, last quantized data held by a register 22x (22y) are inputted to the input A of the selector 21x (21y). Meanwhile, the clock C1 is applied to the input S of the selector 21x through the inverter 23, and the clock C1 is applied directly to the input S of the selector 21y.

As a result, the selector 21x outputs the quantized data, which have been inputted while the clock C1 is on a high level, and while low level, the selector 21x continues outputting the quantized data, which have been inputted last time regardless of the quantized data which is being inputted currently. In the same manner, while the clock C1 is on a high level, the selector 21y continues outputting the quantized data, which have been inputted while the clock C1 is on a low level.

As a result, the data, which have been quantized by the AD converter 4, are classified alternately so that two data streams are created. The two data streams are inputted respectively to FIFO buffers 24x and 24y and are buffered so as to be able to undergo the process in the later stage with the same phase. As mentioned above, since the quantized data are classified into data streams at a channel clock interval by the data classifier 5, the processes after the data classifier 5 are executed based upon a clock with the same frequency as a frequency of the clock C1.

Next, the description is given as to the equalizers 6 and 7. FIG. S is a drawing which shows one concrete example of the arrangement of the equalizers. The equalizers 6 and 7 equalize the quantized data streams s-5x and s-5y which have been inputted from the data classifier 5, using an FIR (Finite Impulse Response) filter composed of registers 31, multipliers 32 and an adder 33. Of course, a number of taps is not limited to the number shown in the drawing, and the arrangement is not limited to that shown in the drawing. The equalizer 6 equalizes the data stream to the PR(1,2,1) characteristic, and the equalizer 7 equalizes the data stream to the PR(1,1) characteristic. However, since these equalizers have a disadvantage that a high frequency noise is raised and thus an SN ratio is deteriorated, a coefficient of each multiplier 32 is adjusted so that a data error rate becomes smaller even if the data stream slightly deviates from a desired PR characteristic.

Figure 9:
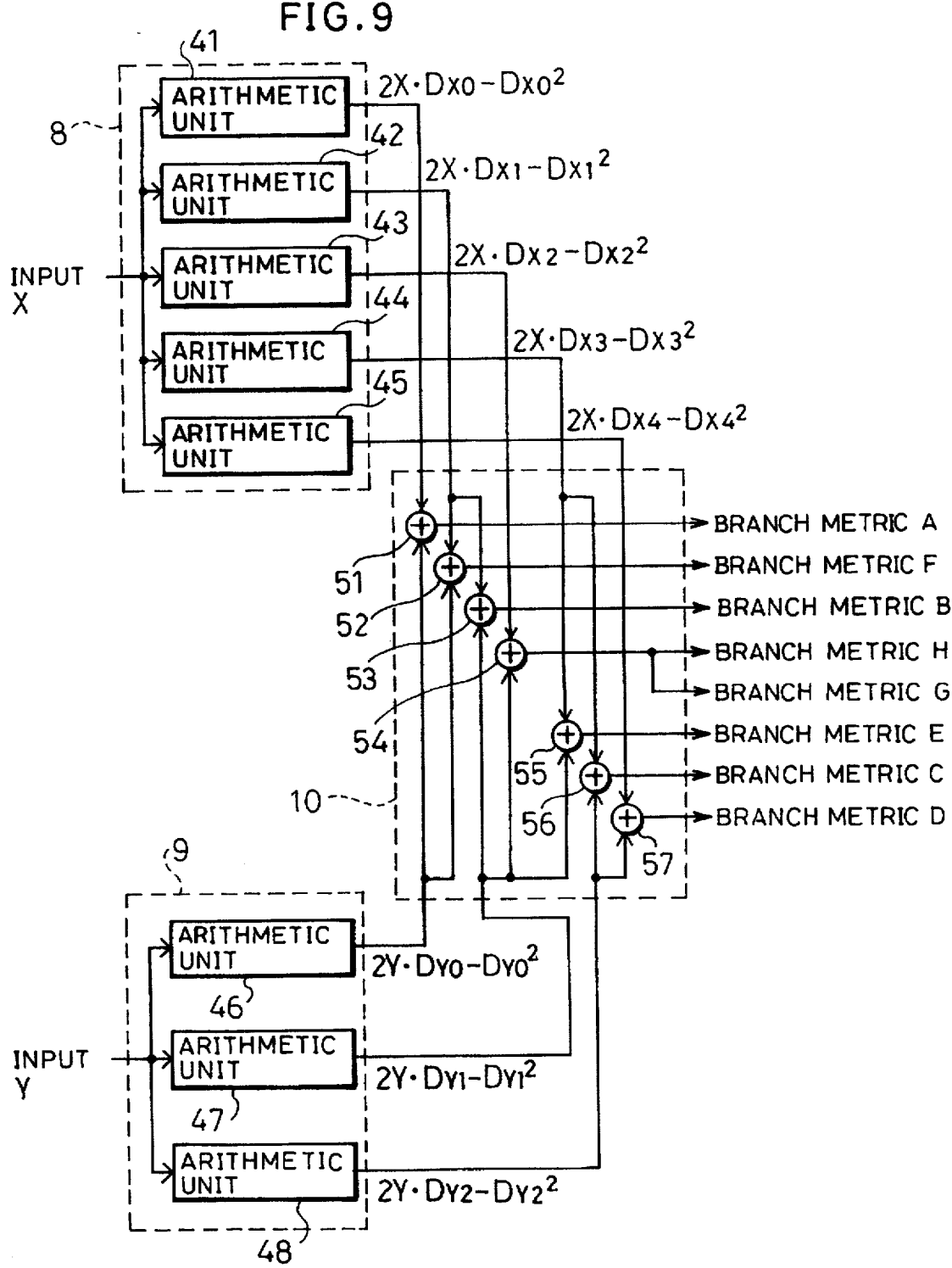
FIG. 9 is a block diagram which shows an arrangement of a branch metric arithmetic unit and a branch metric synthesizer in the data detecting circuit.

An output s-6 of the equalizer 6 is inputted to the branch metric arithmetic unit 8, and an output s-7 of the equalizer 7 is inputted to the branch metric arithmetic unit 9. Then, an output s-8 of the branch metric arithmetic unit 8 and an output s-9 of the branch metric arithmetic unit 9 are synthesized by the branch metric synthesizer 10. FIG. 9 is a drawing which shows one example of the arrangement of the above section. In FIG. 9, the branch metric arithmetic unit 8 calculates following five types of branch metrics using five arithmetic units 41 through 45 correspondingly to the expected value of the PR(1,2,1) characteristic and outputs the calculated branch metrics (X: input).

arithmetic unit 41: $2X \cdot D_{X0} - D_{X0}^2$
arithmetic unit 42: $2X \cdot D_{X1} - D_{X1}^2$
arithmetic unit 43: $2X \cdot D_{X2} - D_{X2}^2$
arithmetic unit 44: $2X \cdot D_{X3} - D_{X3}^2$
arithmetic unit 45: $2X \cdot D_{X4} - D_{X4}^2$ In addition, in FIG. 9, the branch metric arithmetic unit 9 calculates three types of branch metrics correspondingly to the expected value of the PR(1,1) characteristic and outputs the calculated three branch metrics (Y: input).

arithmetic unit 46: $2Y \cdot D_{Y0} - D_{Y0}^2$
arithmetic unit 47: $2Y \cdot D_{Y1} - D_{Y1}^2$
arithmetic unit 48: $2Y \cdot D_{Y2} - D_{Y2}^2$ Two types of branch metrics are calculated per branch by the branch metric arithmetic units 8 and 9.

Meanwhile, the branch metric synthesizer 10 of the present embodiment is provided with adders 51 through 57 for adding up the branch metrics corresponding to the same branch in the two types of the branch metrics and synthesizing the two types of the branch metrics. In FIG. 9, alphabets given to the branch metrics of the outputs correspond to alphabets given to the state transition of the state transition charts (FIGS. 3 and 4(b)). For example, as shown in FIG. 5, an expected value of the branch A is $D_{XO}$ in the case of the PR(1,2,1) characteristic, and is $D_{YO}$ in the case of the PR(1,1) characteristic. Therefore, the adder 51 corresponding to the branch A adds the outputs of the arithmetic units 41 and 46 and calculates a synthetic branch metric corresponding to the branch A. Since the same combination of the two types of branch metrics is used for the branches G and N, synthetic branch metrics of the branches G and H are calculated by the adder 54.

The outputs of the adders 51 through 57 are inputted to the ACS circuit 11 as the synthetic branch metric s-10. The ACS circuit 11 calculates a path metric showing probability of a state transition path (i.e. path) from the past and the current based upon the synthetic branch metric s-10, and selects more probable path, namely, a survival path. Moreover, a selecting signal for the path outputted from the ACS circuit 11 is inputted to the data decoding section 12, and the data are decoded by the data decoding section 12.

Figure 10:
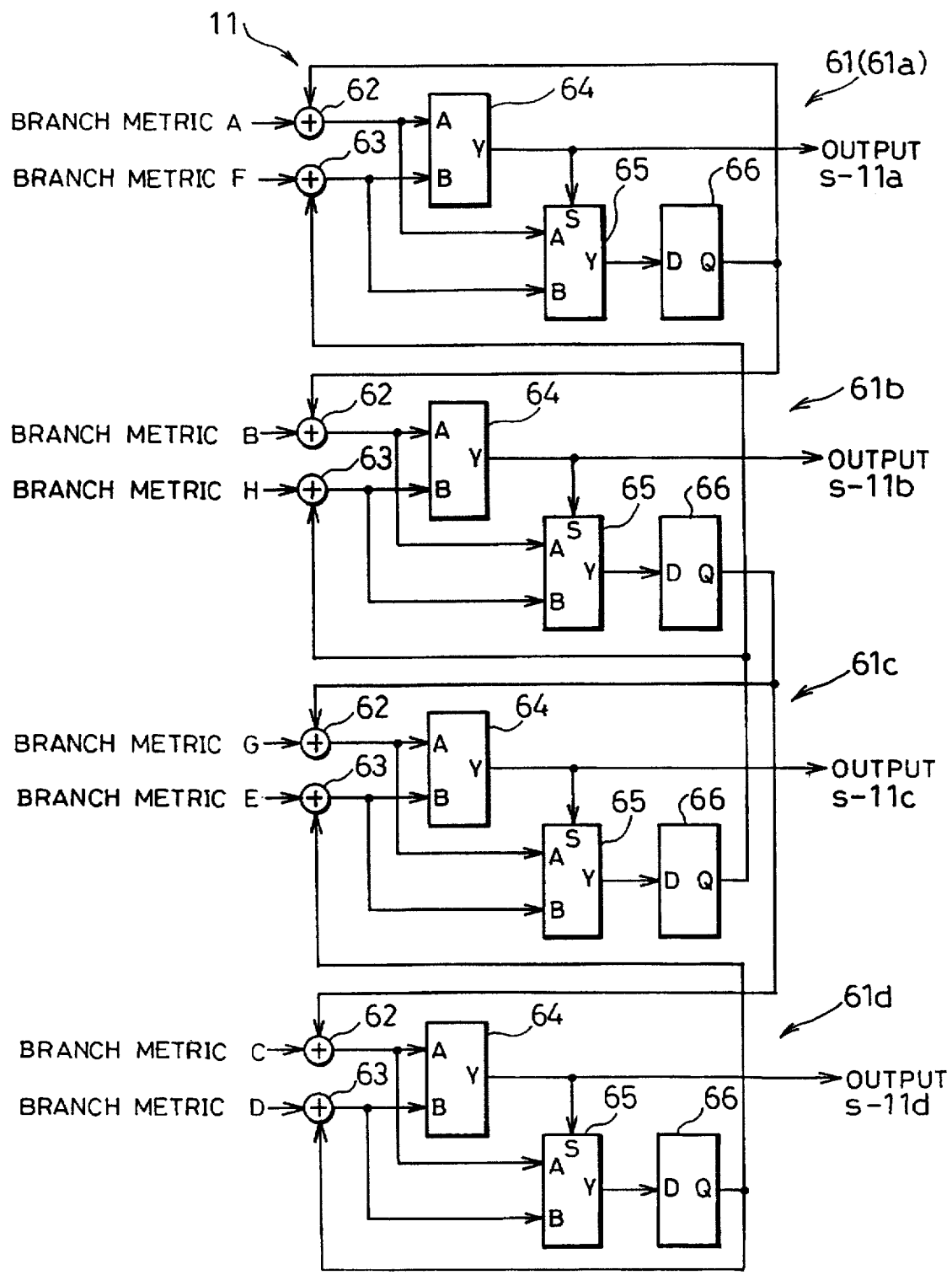
FIG. 10 is a block diagram which shows an arrangement of an addition comparing selection circuit in the data detecting circuit.

The following describes one example of the configuration of the ACS circuit 11. As shown in FIG. 10, the ACS circuit 11 is provided with survival path selecting sections 61a through 61d (general reference numeral is 61) corresponding to each state S00, S10, S01 and S11 shown in FIGS. 3 and 4(b), and the survival path selecting sections can respectively output the selecting signals s-11a through s11-d representing survival paths for each state.

The survival path selecting section 61 is provided with adders 62 and 63 for calculating path metrics of each branch to the corresponding state, a comparator 64 for comparing the path metrics calculated by the adders 62 and 63, a selector 65 for selecting a path whose path metric is large as the survival path, and a register 66 for holding the path metric of the selected path.

The adder 62 (63) adds a metric of corresponding branch and a path metric of a past survival path to the state as the starting point of the branch so as to be able to calculate a path metric of the branch. For example, the branch to the state S00 is A and F, and the starting point of each branch is the state S00 or S01. Therefore, in the survival path selecting section 61a corresponding to the state S00, the adder 62 adds the branch metric A calculated in the branch metric synthesizer 10 and a past path metric held by the register 66 of the survival path selecting section 61a, and the adder 63 adds a branch metric F and a path metric applied from the register 66 of the survival path selecting section 61c corresponding to the state S01.

In addition, in the comparator 64, the path metrics calculated by the adders 62 and 63 are inputted respectively to the inputs A and B, and when the input A> the input B, "1" is outputted from the output Y as the selecting signal of the path. Meanwhile, when the input A≦ the input B, "0" is outputted therefrom.

In addition, in the selector 65, the path metrics are inputted from the adders 62 and 63 to the inputs A and B, and the output Y of the comparator 64 is inputted to the input S. When the input S is "1", the selector 65 outputs a value of the input A from the output Y, and when the input S is "0", outputs a value of the input B. Therefore, a path metric whose value is larger can be supplied to the register 66 as the path metric of the survival path. This path metric is stored in the register 66, and it is used as the path metric of the past survival path at the time of next calculation.

In the survival path selecting sections 61a through 61d, the outputs Y of the comparators 64 are outputted as the path selecting signals s-11a through s-11d and are inputted to the data decoding section 12.

Figure 11:
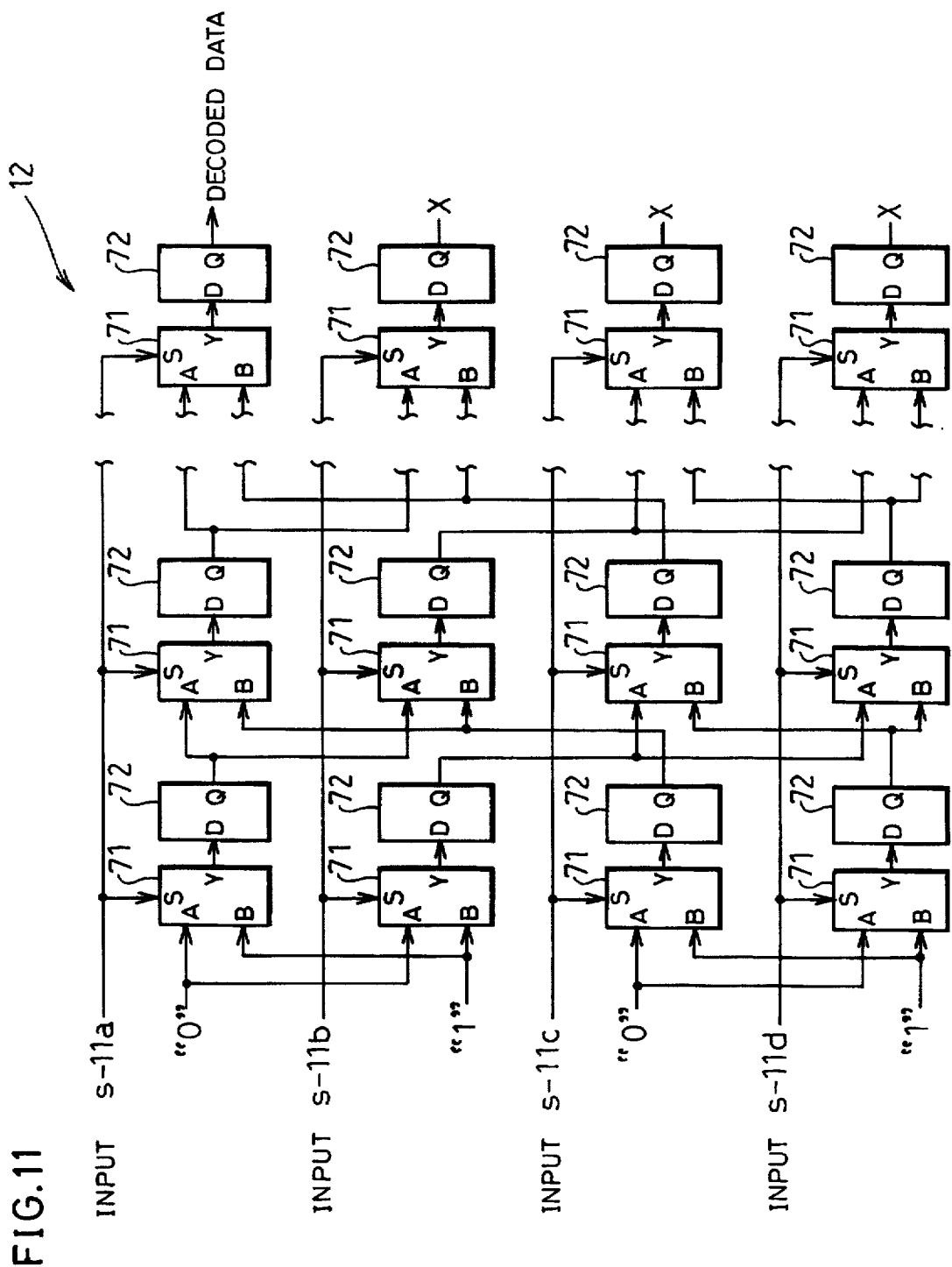
FIG. 11 is a block diagram which shows an arrangement of a data decoding section in the data detecting circuit.

The following describes details of the data decoding section 12 based upon one example of the arrangement shown in FIG. 11. In the data decoding section 12, selectors 71 and registers 72, which are provided correspondingly to the path selecting signals s-11a through s-11d, are connected so as to form a plurality of stages and thus shift registers are arranged. A number of shift register stages, as mentioned above, is set larger so that the output of each shift register becomes equal.

When the input S is "1", each selector 71 outputs the value of the input A from the output Y, and when the input S is "0", outputs the value of the input B. The selector 71 selects one input from the inputs of the two registers 72 provided in the former stage and outputs the selected input. Moreover, the register 72 can hold the output Y of the selector 71 which makes a pair with the register 72, and transmit the output Y to the selector 71 in the next stage. As a result, in the shift register, a shift direction can be determined according to the path selecting signals s-11a through s-11d.

In addition, "0" or "1" is inputted to the inputs A and B of each selector 71 in the first stage of the shift registers. Meanwhile, in the stages after the first stage, the output Q of the register 72 of the registers 72 in the former stage corresponding to the path led to the starting point of the branch represented by the path selecting signal is inputted to the inputs A and B of each selector 71.

Therefore, in the shift register in the first stage, a decoded result is selected according to the state transition of a survival path, and in the stages after the first stage, a decoded result of the survival path is copied. When a number of shift register stages is made large to some degree, values of four registers 72 in the final stage become equal. Namely, past four survival paths are converged on one path. Therefore, the output Q of the arbitrary register 72 in the final stage is outputted as decoded data.

The above arrangement can realize the characteristic of the present invention, namely, to synthesize the quantized data at different sampling points and to Viterbi-decode the quantized data. As a result, the probability that a wrong path is selected as a maximum likelihood path is decreased, thereby decreasing the data error rate in the data detection. For this reason, it is possible to reproduce data which have been recorded at higher density than a conventional arrangement. Moreover, even when the recording density is the same as the conventional one, the data error rate can be decreased smaller than the conventional arrangement, thereby enlarging a margin.

[SECOND EMBODIMENT]

However, in the data detecting circuit according to the first embodiment, occasionally an optimal synthetic branch metric might not be generated depending upon the recording density of data recorded in a recording medium such as the optical disk 1.

Namely, in the case where the data error rate when the data stream s-5x is decoded by the equalizer 6, the branch metric arithmetic unit 8, the ACS circuit 11 and the data decoding section 12 is equal with the data error rate when the data stream s-5y is decoded by the equalizer 7, the branch metric arithmetic unit 9, the ACS circuit 11 and the data decoding section 12, when the sum of branch metrics are calculated so that a synthetic branch metric is created, the minimum error rate can be obtained. However, when one error rate is smaller than the other error rate, the minimum error rate cannot be obtained.

This disagreement in the error rates is caused by an increase in the data error rate, etc. from a branch metric corresponding to a PR characteristic where a number of states is small when, for example, the recording density of the recording medium is increased and thus interference between codes of the reproducing signal becomes large.

The following explains the data detecting circuit which is capable of decoding data at excellent error rate by creating an optimal synthetic branch metric according to the recording density of the recording medium such as an optical disk from a plurality of quantized data streams having different PR characteristics and by Viterbi-decoding the synthetic branch metric on reference to FIGS. 12 through 15. Here, for convenience of explanation, those members that have the same arrangement and functions, and that are described in the aforementioned first embodiment are indicated by the same reference numerals and the description thereof is omitted.

Figure 12:
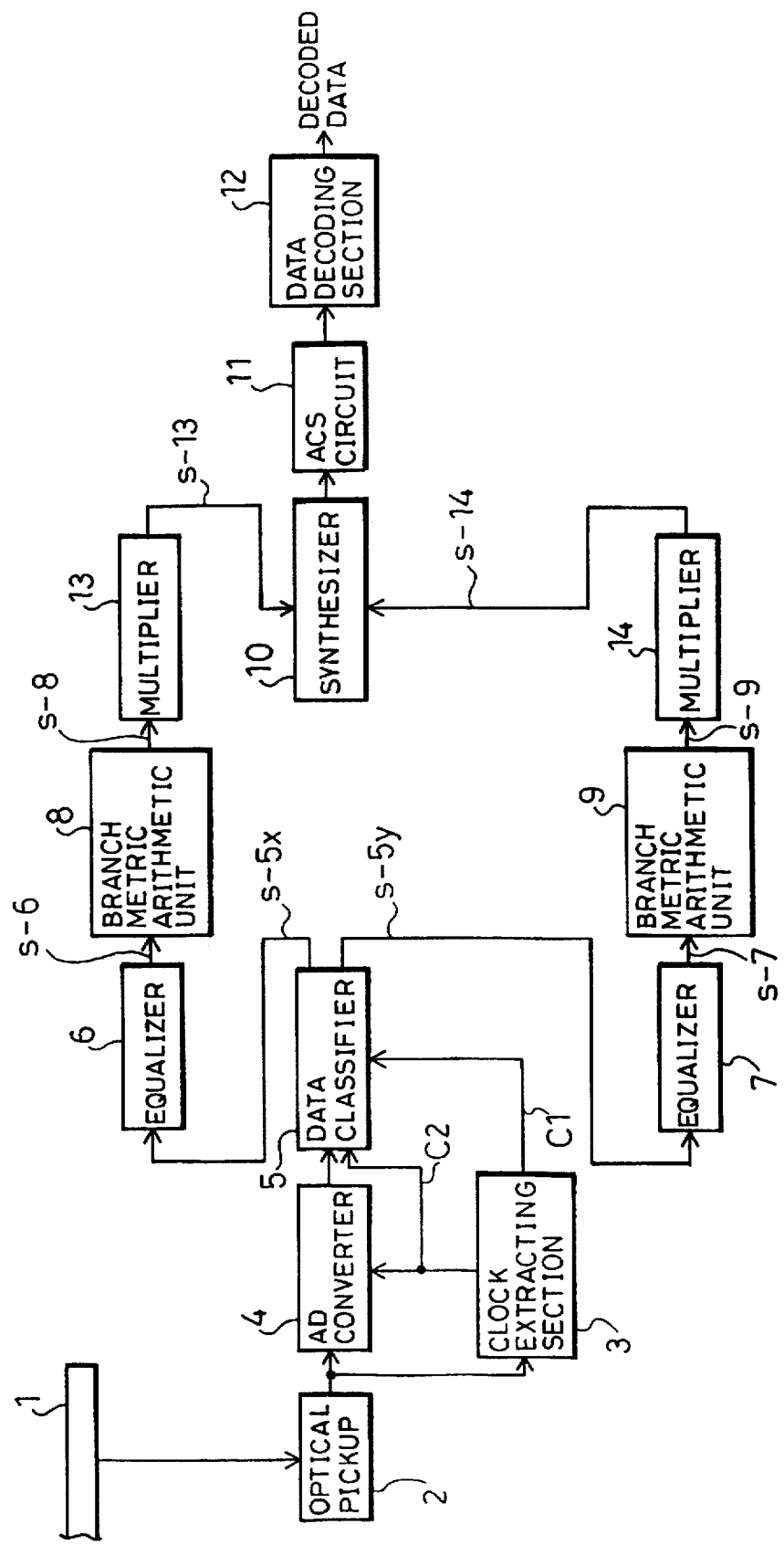
FIG. 12 is a block diagram which shows one configuration example of a data detecting circuit according to second embodiment of the present invention.

As shown in FIG. 12, the data detecting circuit according to the present embodiment is provided with multipliers (weighting means) 13 and 14 respectively between the branch metric arithmetic unit 8 and the branch metric synthesizer 10 and between the branch metric arithmetic unit 9 and the branch metric synthesizer 10. Predetermined coefficients K1 and K2 are respectively set in the multipliers 13 and 14, and the multipliers 13 and 14 can multiply the branch metrics s-8 and s-9 received from the branch metric arithmetic units 8 and 9 by the coefficients K1 and K2. As a result, the branch metrics s-13 and s-14 which have been multiplied by the coefficients (weighted) are inputted to the branch metric synthesizer 10. The branch metric synthesizer 10 adds the branch metrics s-13 and s-14 so as to create one synthetic branch metric.

Figure 13:
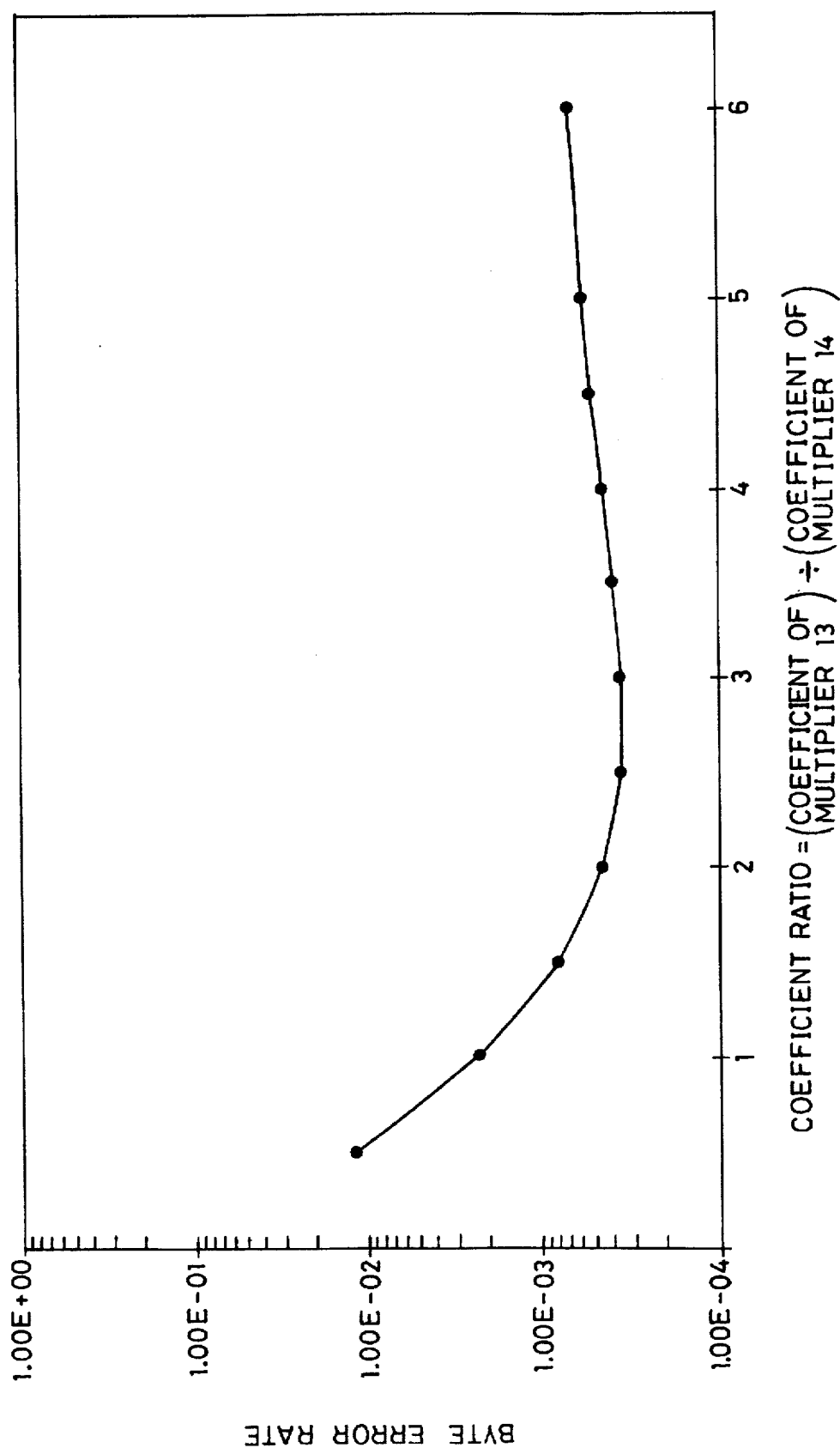
FIG. 13 is a graph obtained by simulation with a computer that shows a relationship between a coefficient ratio of both multipliers and a data error rate in the data detecting circuit.
Figure 14:
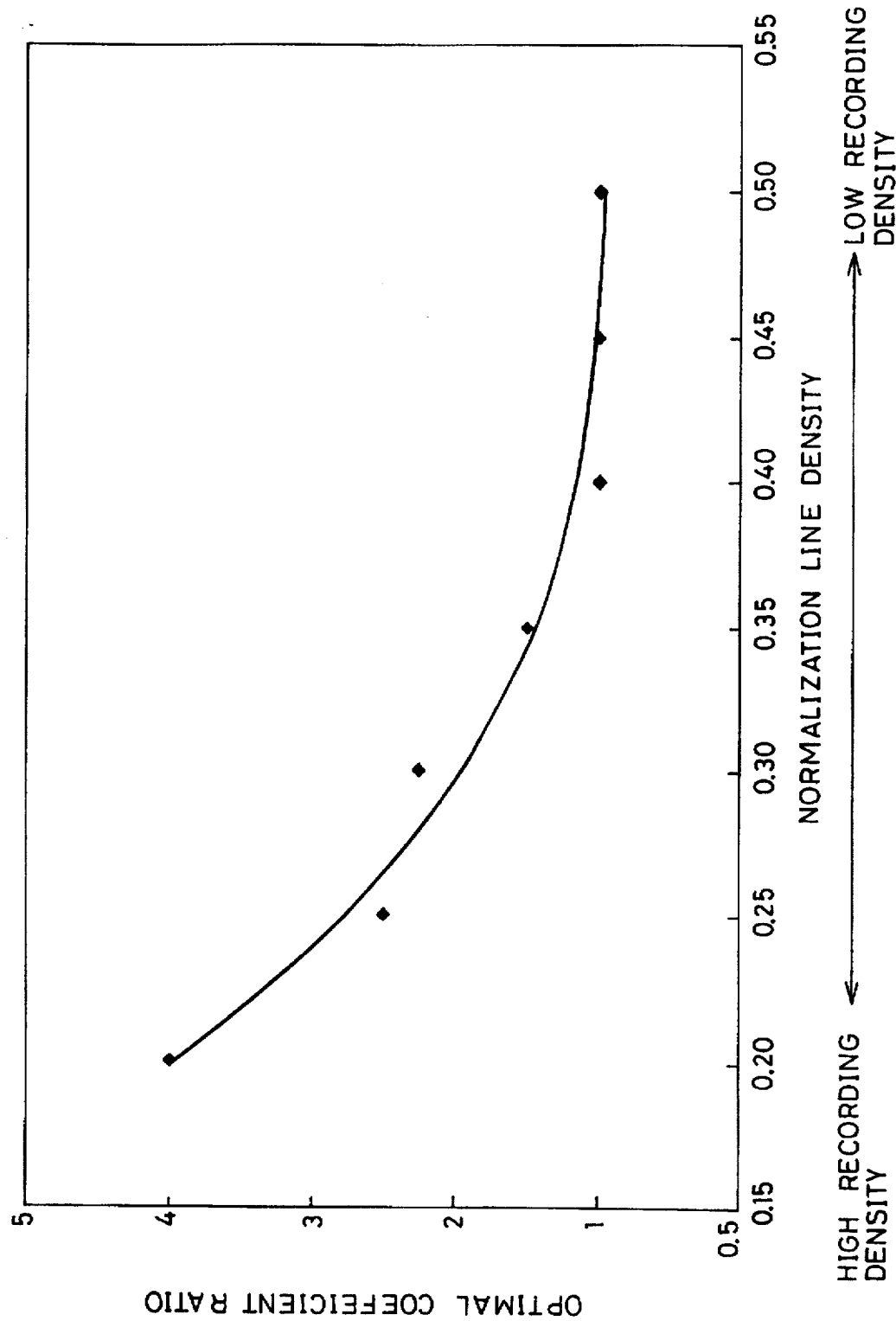
FIG. 14 is a graph obtained by simulation with a computer that shows a relationship between a normalization line density and an optimal coefficient ratio of both the multipliers in the data detecting circuit.
Figure 15:
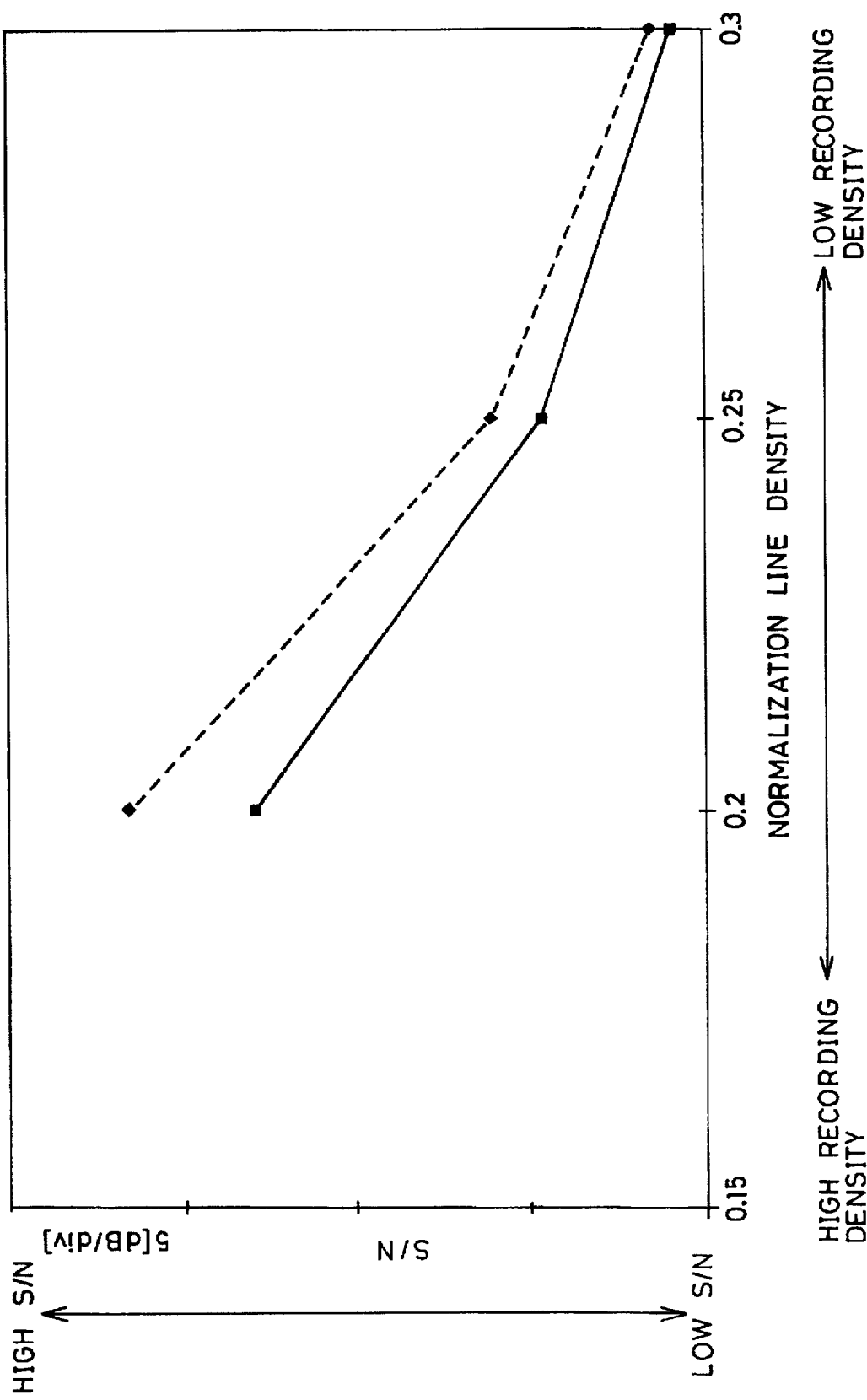
FIG. 15 is a graph obtained by simulation with a computer that shows a relationship between the normalization line density and S/N of a reproducing signal providing a data error rate of $1 \times 10^{-4}$.

The following describes the coefficients K1 and K2, which are used for the multiplication for weighting in the multipliers 13 and 14, using the results of computer simulation shown in FIGS. 13 through 15.

FIG. 13 is a drawing which shows an error rate (byte error rate) in the case where the weighting coefficients of the multipliers 13 and 14 are changed so that non-modulation recording data are detected at a normalization line density of 0.25 and on a constant noise level. The normalization line density is obtained by dividing a length of data with 1 bit by a beam spot diameter of the optical pickup, and the smaller its numerical value is, the higher the recording density is.

A horizontal axis in FIG. 13 represents the ratio of the coefficient K1 of the multiplier 13 to the coefficient K2 of the multiplier 14 ((coefficient K1 of multiplier 13)÷(coefficient K2 of multiplier 14)). The coefficient K1 is used for weighting a branch metric s-8 of the data stream s-6 equalized to the PR(1,2,1). The coefficient K2 is used for weighting a branch metric s-9 of the data stream s-7 equalized to the PR(1,1).

In the case of the coefficient ratio=1, the branch metric calculated result s-8 and the branch metric calculated result s-9 are respectively multiplied by the same coefficient. Therefore, the above case is the same with the case without the multipliers 13 and 14 (namely, the data detecting circuit according to the first embodiment). Moreover, the case of coefficient ratio=5 means that the coefficient K1 of the multiplier 13 is five times as large as the coefficient K2 of the multiplier 14.

As is clear from FIG. 13, the error rate is minimum in the coefficient ratio of between 2.5 and 3. For this reason, when the normalization line density is 0.25, it is desirable that the coefficient K1 of the multiplier 13 is previously set so that the value is from 2.5 times to 3 times as large as the coefficient K2 of the multiplier 14. As a result, the data error rate can be decreased to $3.3 \times 10^{-4}$ which is lower by about one digit than $2.1 \times 10^{-3}$ in the case of the coefficient ratio 1 without using the multipliers 13 and 14.

Here, if the coefficient K1 of the multiplier 13 is set to 2.5-3 and the coefficient K2 of the multiplier 14 is set to 1, the multiplier 14 should not be required. However, in general, when a coefficient of a multiplier is integer, the circuit becomes simple. Therefore, in the case where the coefficient ratio is 2.5, the multipliers can be easily arranged by setting the coefficient K1 of the multiplier 13 to 5 and the coefficient K2 of the multiplier 14 to 2.

FIG. 14 is a drawing which shows the coefficient ratio (vertical axis) dependency of the detected data error rate in the multipliers 13 and 14 in the case where the normalization line density (horizontal axis) is changed. The lower the normalization line density is (the recording density becomes higher), the larger the most suitable coefficient ratio becomes. Therefore, it is found that when data with high density are detected, the coefficient K1 of the multiplier 13 should be set so as to be larger than the coefficient K2 of the multiplier 14.

This is due to the following reason. The higher the recording density becomes, the larger the interference between codes of the reproducing signal becomes, and thus the signal waveform deviates from the PR(1,1) characteristic. As a result, the data error rate in the case where data are decoded independently by using the data stream s-7 which was equalized to the PR(1,1) characteristic becomes higher than the data error rate in the case where data are decoded independently by using the data stream s-6 which was equalized to the PR(1,2,1) characteristic.

FIG. 15 is a drawing which shows a relationship between the normalization line density and the S/N of the reproducing signal in which the data error rate of $1 \times 10^{-4}$ is obtained. Here, the vertical axis represents the S/N and the horizontal axis represents the normalization line density. In FIG. 15, the solid line shows a result in the case where the coefficients K1 and K2 of the multipliers 13 and 14 are set so that the coefficient ratio becomes the most suitable in each normalization line density, namely, the most suitable coefficient ratio shown in FIG. 14. The broken line shows a result in the case where the coefficient ratio is 1, namely, the multipliers 13 and 14 are not used.

Even in the case where the S/N of the reproducing signal is lower than the first embodiment, the data error rate of $1 \times 10^{-4}$ can be obtained by using the most suitable coefficient ratio shown in the drawing. In particular, at the normalization line density of 0.2, even if the S/N of the reproducing signal is lowered by 3 [dB], data can be detected at the same error rate as the first embodiment.

In such a manner, when the coefficients K1 and K2 of the multipliers 13 and 14 are previously set according to the recording density of an optical disk to be used for reproduction, data can be detected at low error rate. Moreover, if the S/N of the reproducing signal is lowered, the data detecting ability is improved.

In the present embodiment, the multipliers 13 and 14 are located in the stage after the branch metric arithmetic units 8 and 9, but they may be located in the stage before the branch metric arithmetic units 8 and 9 so that each data stream may be weighted. However, in the case where each data stream is weighted in the stage before the branch metric arithmetic units 8 and 9, in addition to the setting of the coefficients K1 and K2 of the multipliers 13 and 14, an expected value at the time of calculating a branch metric should be also changed according to weighting. Therefore, the setting becomes slightly complicated.

[THIRD EMBODIMENT]

Figure 16:
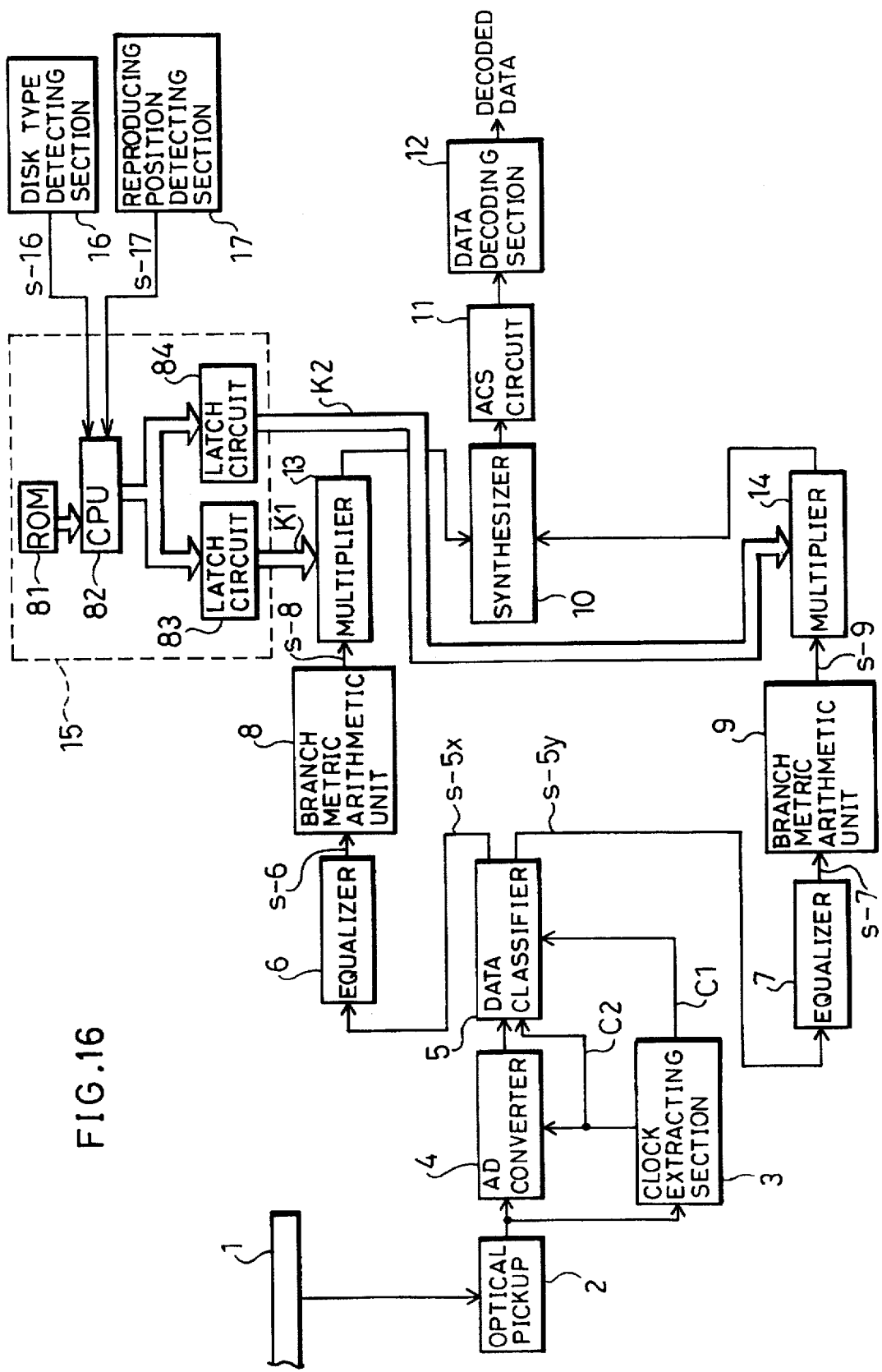
FIG. 16 is a block diagram which shows one configuration example of the data detecting circuit according to third embodiment of the present invention.

The following describes the data detecting circuit of third embodiment on reference to FIG. 16. In addition to the arrangement shown in FIG. 12, the data detecting circuit in FIG. 16 is provided with a coefficient changing unit (weight changing means) 15 for changing the coefficients K1 and K2 of the multipliers 13 and 14, a disk type detecting section (first detecting means) 16 and a reproducing position detecting section (second detecting means) 17 for giving signals s-16 and s-17 representing the recording density of the optical disk 1 to the coefficient changing unit 15. Here, members that are same as the FIG. 12 are indicated by the same reference numerals and the description thereof is omitted.

As mentioned in the second embodiment, in the multipliers 13 and 14, the most suitable values of the coefficients K1 and K2 differ with the data recording density. However, as the optical disk 1 which is a recording medium, a many types of optical disks such as a magneto-optical disk for a computer and DVD are used. The recording density of these optical disks differs with their types, and the recording density of the same type of optical disks differs with its radial position. Therefore, the coefficient changing unit 15 set the most suitable coefficients K1 and K2 respectively in the multipliers 13 and 14 based upon the signals s-16 and s-17 representing the data recording density.

More specifically, the disk type detecting section 16 is, for example, a disk thickness detecting unit and a disk reflectance detecting unit, and it can detect a type of the optical disk 1 used for current reproduction. Moreover, the reproducing position detecting unit 17 is, for example, a track position detecting unit, and it can detect a position in the optical disk 1 where reproduction is executed by the optical pickup 2. The detected results by the detecting units 16 and 17 are transmitted to the coefficient changing unit 15 as the information signals s-16 and s-17 representing the data recording density.

Meanwhile, in the coefficient changing unit 15 according to the present embodiment, the most suitable coefficient values K1 and K2, which are obtained based upon the relationship shown in FIG. 14 between the data recording density and the most suitable coefficient ratio, are previously stored in a ROM (Read-Only Memory; storing means) 81. A CPU (Central Processing Unit; control means) 82 identifies data recording density based upon the signals s-16 and s-17 and reads out coefficients value which is the most suitable to the recording density from the ROM 81. Moreover, the CPU 82 sets the most suitable coefficient value K1 in the multiplier 13 read from the ROM 81 by means of a latch circuit 83, and sets the most suitable coefficient value K2 in the multiplier 14 read from the ROM 81 by means of a latch circuit 84.

The coefficients K1 and K2 of the multipliers 13 and 14 are set every time when the optical disk 1 is changed, or the reproducing position on the optical disk 1 is changed.

As mentioned above, in the data detecting circuit according to the present embodiment, since the coefficients K1 and K2 of the multipliers 13 and 14 are always changed to the most suitable values according to the data recording density, the data can be detected at a lower error rate.

The coefficient changing unit 15 is not limited to the above arrangement, but the arrangement can be realized easily by using a CPU. Needless to say, in general, the CPU is also used as a CPU for controlling an optical disk apparatus.

As mentioned in the first through third embodiments, the data detecting circuit includes data stream generating circuit, the branch metric generating circuits, branch metric synthesizing circuit and data decoding circuit. The data stream generating circuit quantizes and equalizes the signals at sampling points with different phases so as to generate a plurality of data streams having different PR characteristics. The branch metric generating circuit generates branch metrics showing the data streams and probability of each state transition of the signals based upon the PR characteristics of the data streams. The branch metric synthesizing circuit generates synthetic branch metrics corresponding to each state transition based upon the branch metrics generated by the branch metric generating circuits. The data decoding circuit Viterbi-decodes data based upon the synthetic branch metrics.

In the above arrangement, when data are decoded, a plurality of branch metrics are calculated based upon the different PR characteristics. Moreover, the data are Viterbi-decoded by using the synthetic branch metrics which have been generated by the combinations of the branch metrics. The synthetic branch metric is calculated by an adder, for example, for adding various branch metrics.

As a result, compared with the case where the Viterbi-decoding is executed based upon one type of the PR characteristic, a difference in probability between an arbitrary state transition and another arbitrary state transition becomes larger. As a result, since the probability that a wrong path is selected as a maximum likelihood path is decreased at the time of Viterbi-decoding, the data error rate of the decoded result can be decreased.

When the above branch metrics are compared with another branch metrics, it may be desirable that a judgment can be made as to which state transition corresponding to the above branch metric or another branch metric is probable. As the above method of generating the branch metrics by the branch metric generating circuit, various methods can be considered. For example, when generating branch metric of each state transition, the branch metric generating circuit may calculate the probability density functions of each state transition as the branch metric. However, in this case, it is necessary for the branch metric synthesizing circuit to generate a synthetic branch metric from the product of plural kinds of the branch metrics, so this method is not practical.

Therefore, it is more preferable that each of the branch metric generating circuits generates each of the branch metrics based upon a logarithm of the probability density function of each state transition. More concretely, the branch metric is calculated by multiplying the logarithm of the probability density function by a predetermined number or adding an offset to the logarithm, namely transforming $(X-Dx)^2$ when a size of the data received from the data stream generating circuit is represented by X and the expected value of the state transition corresponding to the branch metric is represented by Dx. More specifically, it is desirable that each of the branch metric generating circuit calculates the branch metrics based upon a difference between $2X \cdot Dx$ and $Dx^2$ which is obtained by $X^2 - 2X \cdot Dx + Dx^2$, $-2X \cdot Dx + Dx^2$ or $2X \cdot Dx - Dx^2$, for example.

In this case, as represented by the equation (6), each synthetic branch metric becomes the sum of plural kinds of the branch metrics. As a result, the branch metric synthesizing circuit can be realized by a simple circuit such as an adder for adding plural kinds of branch metrics.

In addition, when the error rate of the branch metrics calculated from the data streams are different from each other, as mentioned in the second and third embodiments, in addition to the above arrangement, it is preferable that weighting circuit is provided according to at least one of the data stream. The weighting circuit weights each branch metric to be calculated from the data streams according to the PR characteristic of the data stream. The weighting circuit can be arranged by a simple circuit such as a multiplier.

In accordance with the above arrangement, as the data error rate in the case where a plurality of data streams are Viterbi-decoded independently becomes lower, the larger weight is applied to the branch metrics and thus the branch metric synthesizing circuit can synthesizes the branch metrics. As a result, in the case where the recording density of the recording medium is increased, for example, and thus the S/N ratio of the signal is lowered, even if the data error rate from the branch metric corresponding to the PR characteristic with a small number of states is increased, the branch metric synthesizing circuit can generate the most suitable synthetic branch metric. As a result, the data detecting circuit can decode data at more satisfactory error rate.

In the above embodiments, the data detecting circuit is used for detecting data recorded in the optical disk, but it is applicable to another data detecting circuit such as a receiving circuit. In this case, instead of the output of the optical pickup 2, the data which have been transmitted through a channel are inputted to the clock extracting section and the AD converter 4 shown in FIGS. 1, 12 and 16. However, if the data detecting circuit having the above various arrangements is used, data can be decoded at a lower error rate than the conventional arrangement. Therefore, the data detecting circuit with the above arrangement is particularly suitable for detecting data from a reproducing signal of the recording medium such as an optical disk where high density recording is executed.

In general, when the recording density of the recording medium is increased, the S/N ratio of the reproducing signal is lowered due to the interference between codes, and thus the data error rate is increased. However, even if the S/N ratio of the reproducing signal is lower, data can be decoded at a satisfactory data error rate by using the data detecting circuits having the above configurations. As a result, the data detecting circuit is effective in improving the recording density of the recording medium. Moreover, even if the recording density and the S/N ratio are equivalent to the conventional arrangement, data can be decoded at more satisfactory error rate compared to the conventional error rate. As a result, a margin at the time of data detection can be enlarged.

As mentioned above, in the case where the data detecting circuit is used for detecting data from the reproducing signal of a recording medium, when each data stream is Viterbi-decoded independently, the data error rate can be estimated according to the recording density of the recording medium. Therefore, when the recording density of the recording medium is different from each other, in addition to the above arrangement, it is desirable that detecting for detecting recording density of a recording medium, and weight changing circuit for instructing the weighting circuit to weight a branch metric based upon the instruction of the detecting circuit.

In accordance with the above arrangement, the weighting rate among the data streams is changed according to the data recording density. Therefore, even in the case where data recording density is variable, such as the case where a plural types of recording media with different recording density are used and case where reproduction is executed from a recording medium whose recording density is different with a data reproducing position such as a radial position, the branch metric synthesizing circuit can always generate the most suitable synthetic branch metric. As a result, the data detecting circuit can detect data at a lower error rate.

The above embodiments describes the example that the PR(1,2,1) characteristic and the PR(1,1,) characteristic are used together, but the present invention is not limited to these characteristics, so it is applicable to the case where another PR characteristic is used.

Figure 17:
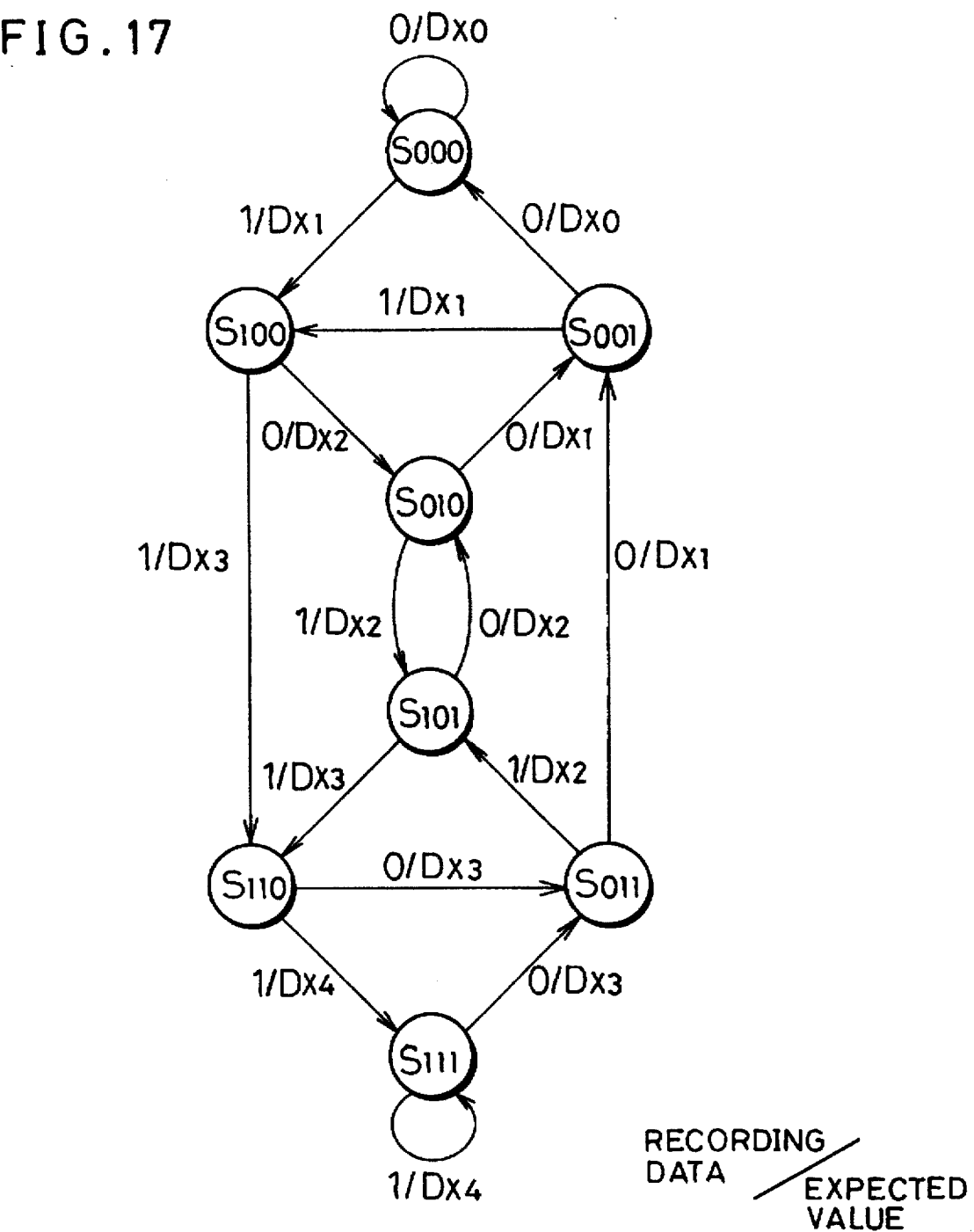
FIG. 17 is a state transition chart of the PR(1,2,1) characteristic when the PR(1,2,1) characteristic and a PR(1,2,2,1) characteristic are used together.
Figure 18:
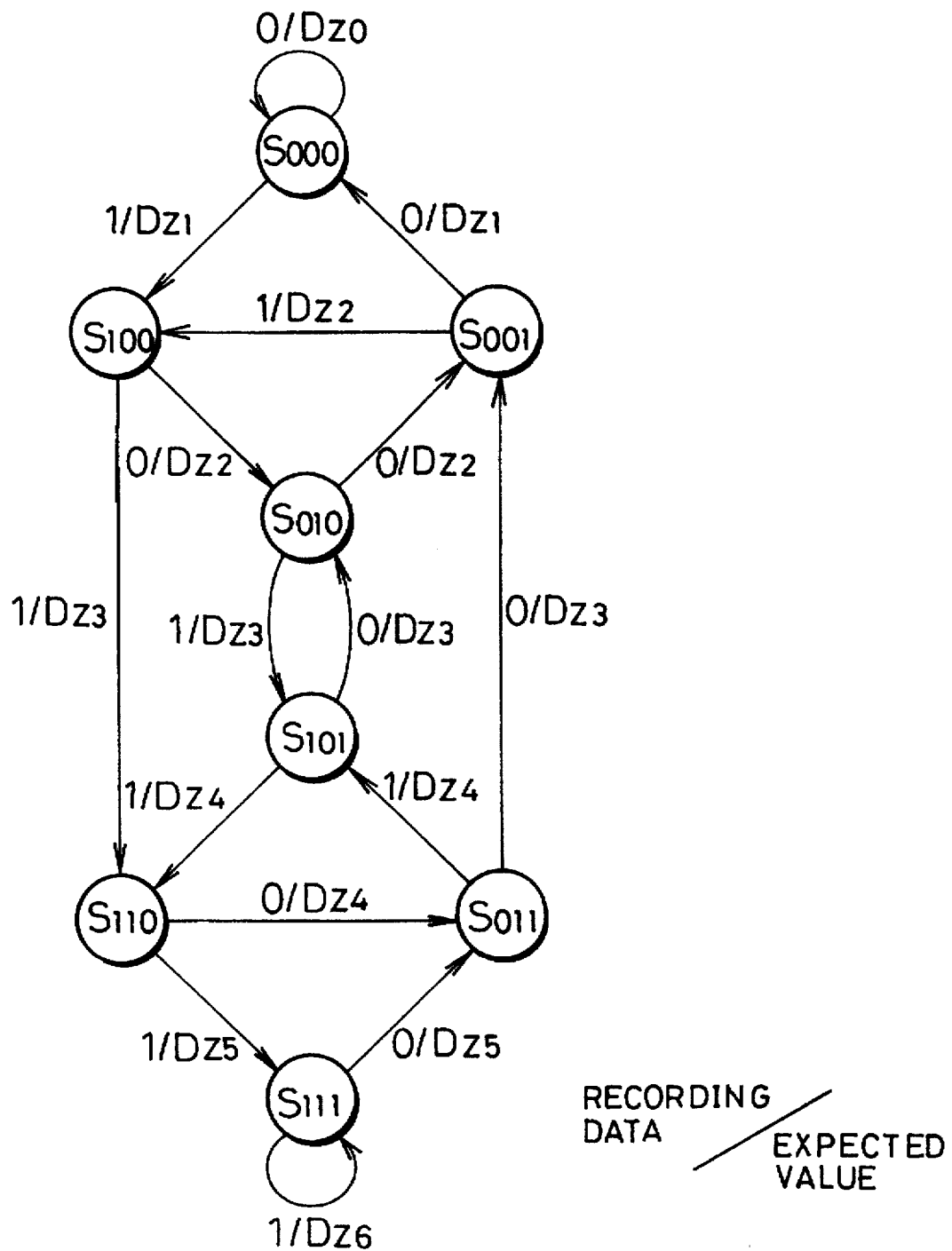
FIG. 18 is a state transition chart of the PR(1,2,2,1) characteristic when the PR(1,2,1) characteristic and the PR(1,2,2,1) characteristic are used together.

For example, the PR characteristic at the time of sampling with the phase x can be considered as the PR (1,2,1) characteristic and the PR characteristic at the time of sampling with the phase y can be considered as a PR(1,2,2,1) characteristic. The PR(1,2,2,1) characteristic has seven expected values ($D_{Z0}$ through $D_{Z6}$), and eight states. Therefore, the state transition of the PR(1,2,2,1) characteristic is shown in FIG. 18. Moreover, the state transition chart, which is obtained by enlarging the state transition chart of the PR(1,2,1) according to a number of states of the PR(1,2,2,1) characteristic, is shown in FIG. 17. The detailed configuration of the data detecting circuit in this case is not shown, but the data detecting circuit can be easily arranged in the same manner as the case where the PR(1,2,1) characteristic and the PR(1,1) characteristic are used together.

Figure 21:
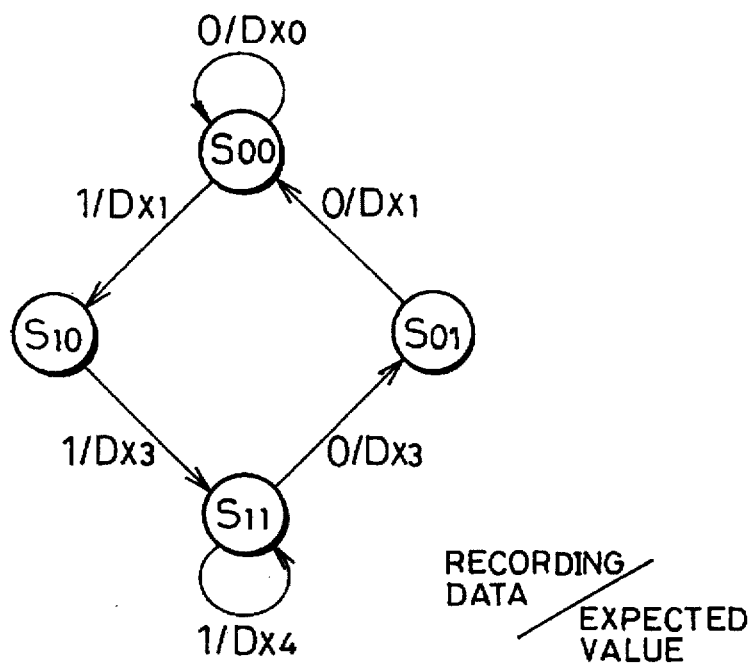
FIG. 21 is a state transition chart of the PR(1,2,1) characteristic when the PR(1,2,1) characteristic and the PR(1,1) characteristic are used together and a characteristic of a recording code that a minimum inverting interval is not less than 2 channel bits is considered.
Figure 22:
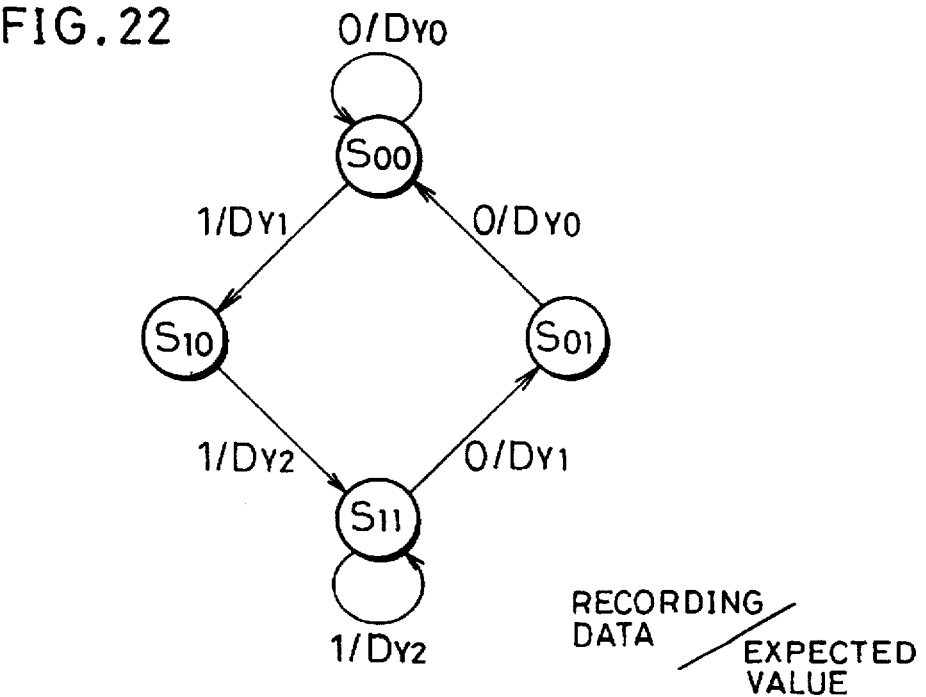
FIG. 22 is a state transition chart of the PR(1,1) characteristic when the PR(1,2,1) characteristic and the PR(1,1) characteristic are used together and a characteristic of a recording code that a minimum inverting interval is not less than 2 channel bits is considered.

In addition, at the time of recording in a recording medium, recording data are usually encoded by a recording code so as to be recorded, and the data detecting system of the present invention can be invented after a characteristic of a minimal inverting interval of the code is considered. For example, a recording code whose minimal inverting interval is 2 channel bits or more is (1,7) RLL (Run Length Limited) code. Its translation table is shown in FIG. 19. Recording data are translated according to the translation table, and are subject to translation through "1", namely, NRZI (Non Return to Zero Inverted) translation so as to be recorded. As a result, the minimal inverting interval becomes not less than 2 channel bits. Moreover, an example of a recording code whose minimal inverting interval becomes not less than 3 channel bits is (2,7) RLL code. Its translation table is shown in FIG. 20. Recording data are translated according to the translation table, and are subject to translation through "1", namely, the NRZI translation so as to be recorded in a recording medium. As a result, the minimal inverting interval becomes not less than 3 channel bits. The state transition charts of each PR characteristic in the case where the above characteristics are considered are shown in FIGS. 21 through 28. FIG. 21 is the state transition chart of the PR(1,2,1) characteristic when the PR(1,2,1) characteristic and the PR(1,1) characteristic are used together and a characteristic of a recording code whose minimal inverting interval is not less than 2 channel bits is considered. FIG. 22 is the state transition chart of the PR(1,1) characteristic when the PR(1,2,1) characteristic and the PR(1,1) characteristic are used together and a characteristic of a recording code whose minimal inverting interval is not less than 2 channel bits is considered.

Figure 23:
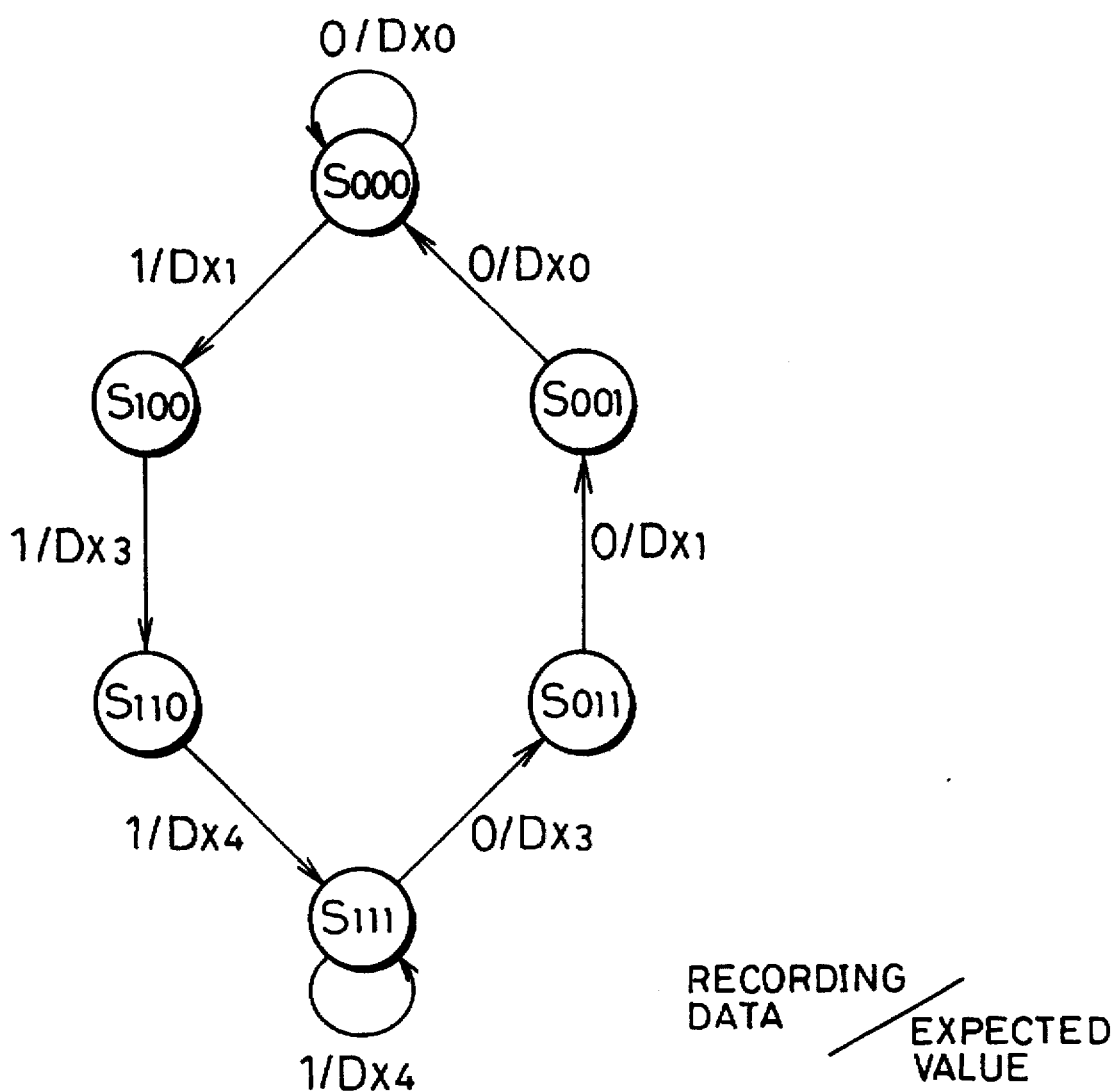
FIG. 23 is a state transition chart of the PR(1,2,1) characteristic when the PR(1,2,1) characteristic and the PR(1,1) characteristic are used together and a characteristic of a recording code that a minimum inverting interval is not less than 3 channel bits is considered.
Figure 24:
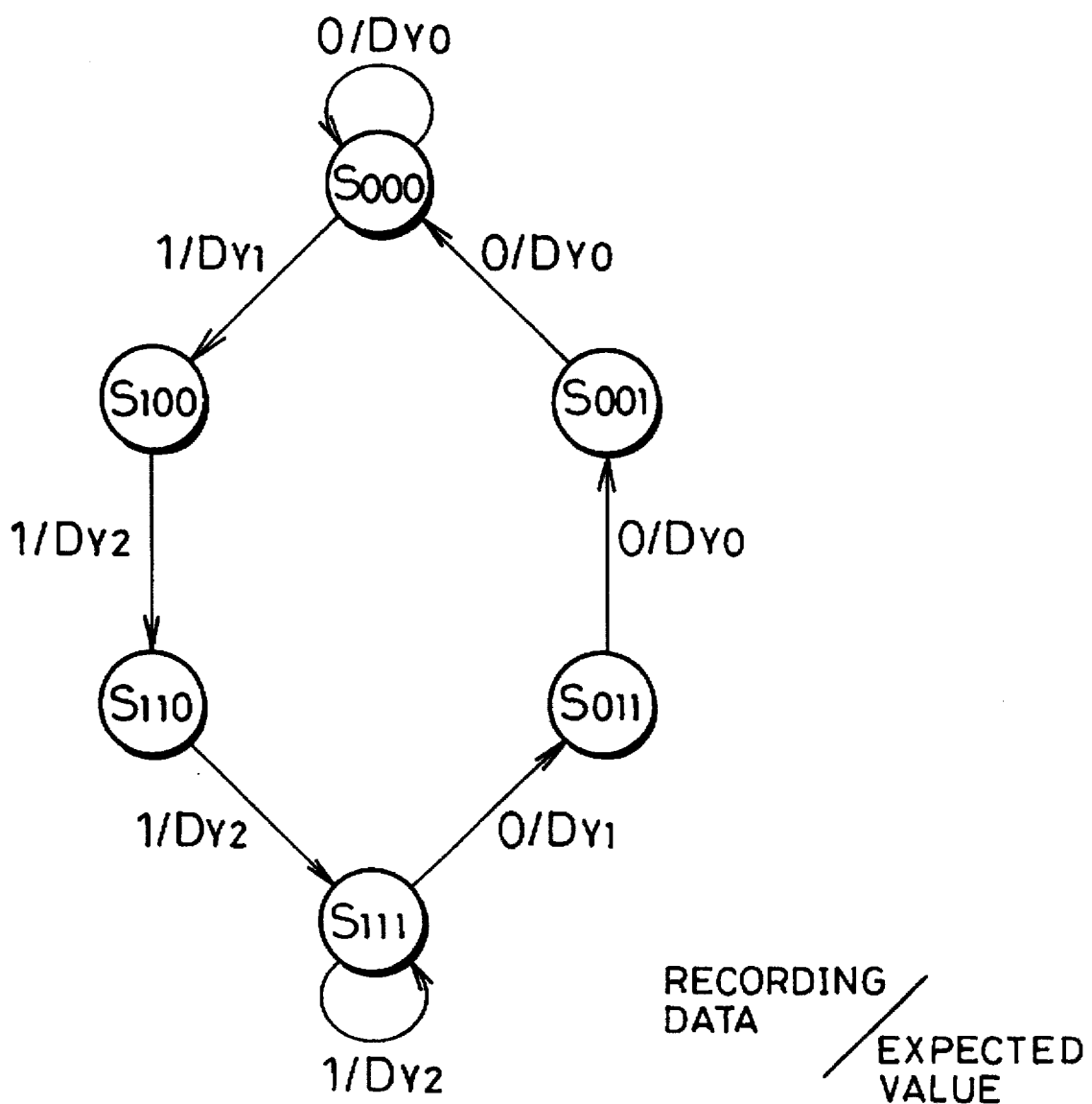
FIG. 24 is a state transition chart of the PR(1,1) characteristic when the PR(1,2,1) characteristic and the PR(1,1) characteristic are used together and a characteristic of a recording code that a minimum inverting interval is not less than 3 channel bits is considered.

FIG. 23 is the state transition chart of the PR(1,2,1) characteristic when the PR(1,2,1) characteristic and the PR(1,1) characteristic are used together and a characteristic of a recording code whose minimal inverting interval is not less than 3 channel bits is considered. FIG. 24 is the state transition chart of the PR(1,1) characteristic when the PR(1,2,1) characteristic and the PR(1,1) characteristic are used together and a characteristic of a recording code whose minimal inverting interval is not less than 3 channel bits is considered.

Figure 25:
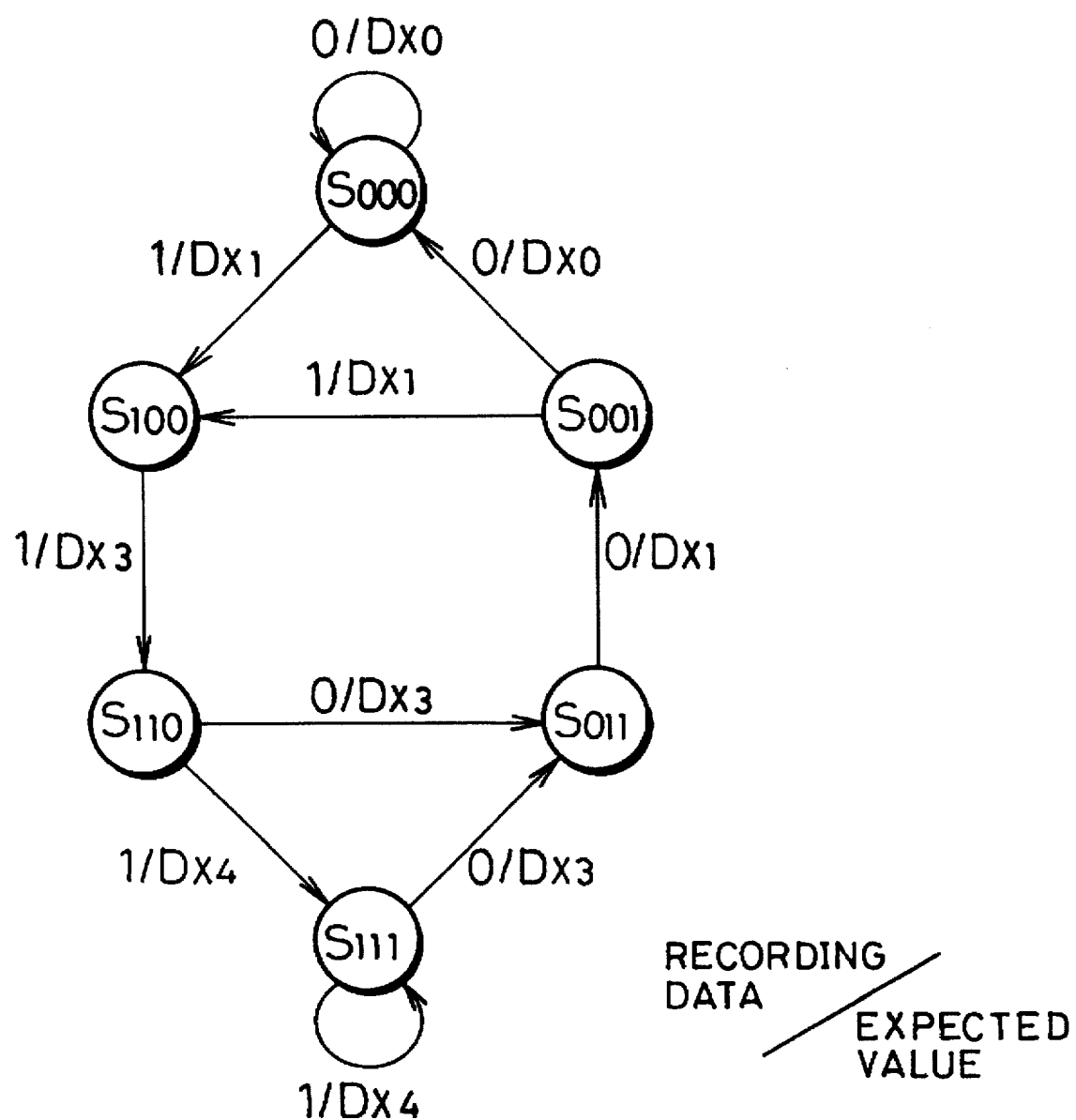
FIG. 25 is a state transition chart of the PR(1,2,1) characteristic when the PR(1,2,1) characteristic and the PR(1,2,2,1) characteristic are used together and a characteristic of a recording code that a minimum inverting interval is not less than 2 channel bits is considered.
Figure 26:
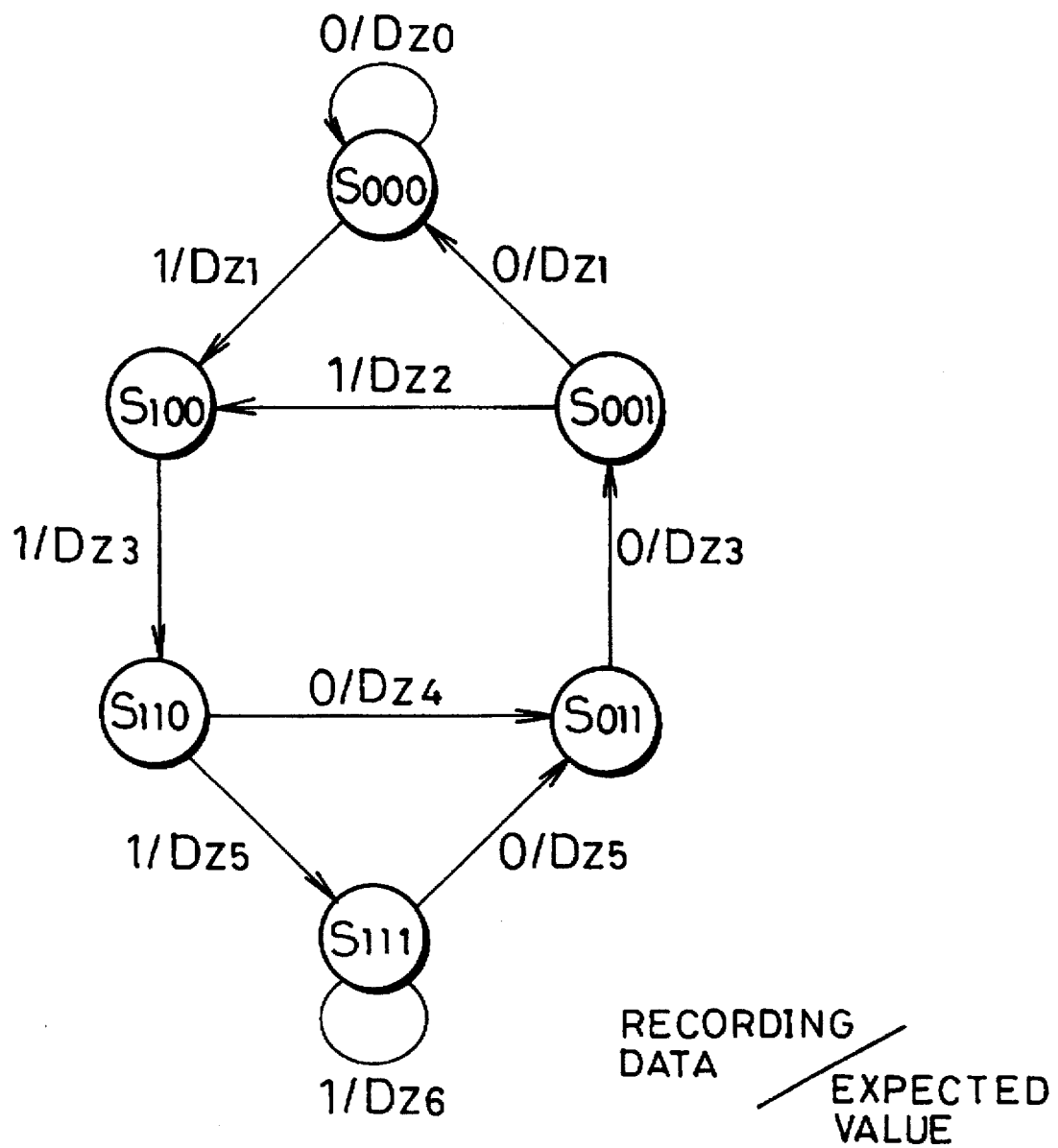
FIG. 26 is a state transition chart of the PR(1,2,2,1) characteristic when the PR (1,2,1) characteristic and the PR(1,2,2,1) characteristic are used together and a characteristic of a recording code such that a minimum inverting interval is not less than 2 channel bits is considered.

FIG. 25 is the state transition chart of the PR(1,2,1) characteristic when the PR(1,2,1) characteristic and the PR(1,2,2,1) characteristic are used together and a characteristic of a recording code whose minimal inverting interval is not less than 2 channel bits is considered. FIG. 26 is the state transition chart of the PR(1,2,2,1) characteristic when the PR(1,2,1) characteristic and the PR(1,2,2,1) characteristic are used together and a characteristic of a recording code whose minimal inverting interval is not less than 2 channel bits is considered.

Figure 27:
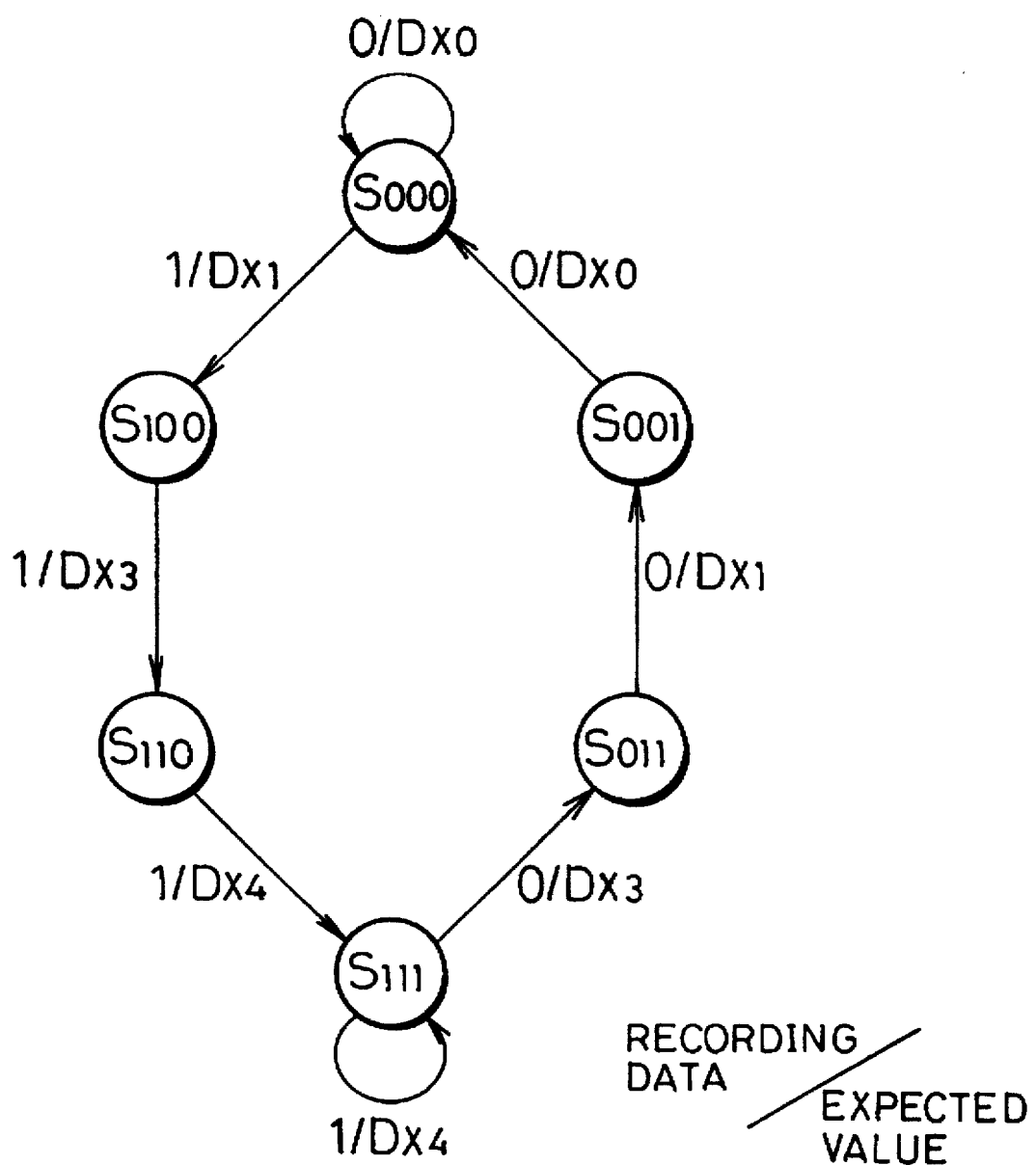
FIG. 27 is a state transition chart of the PR(1,2,1) characteristic when the PR(1,2,1) characteristic and the PR(1,2,2,1) characteristic are used together and a characteristic of a recording code that a minimum inverting interval is not less than 3 channel bits is considered.
Figure 28:
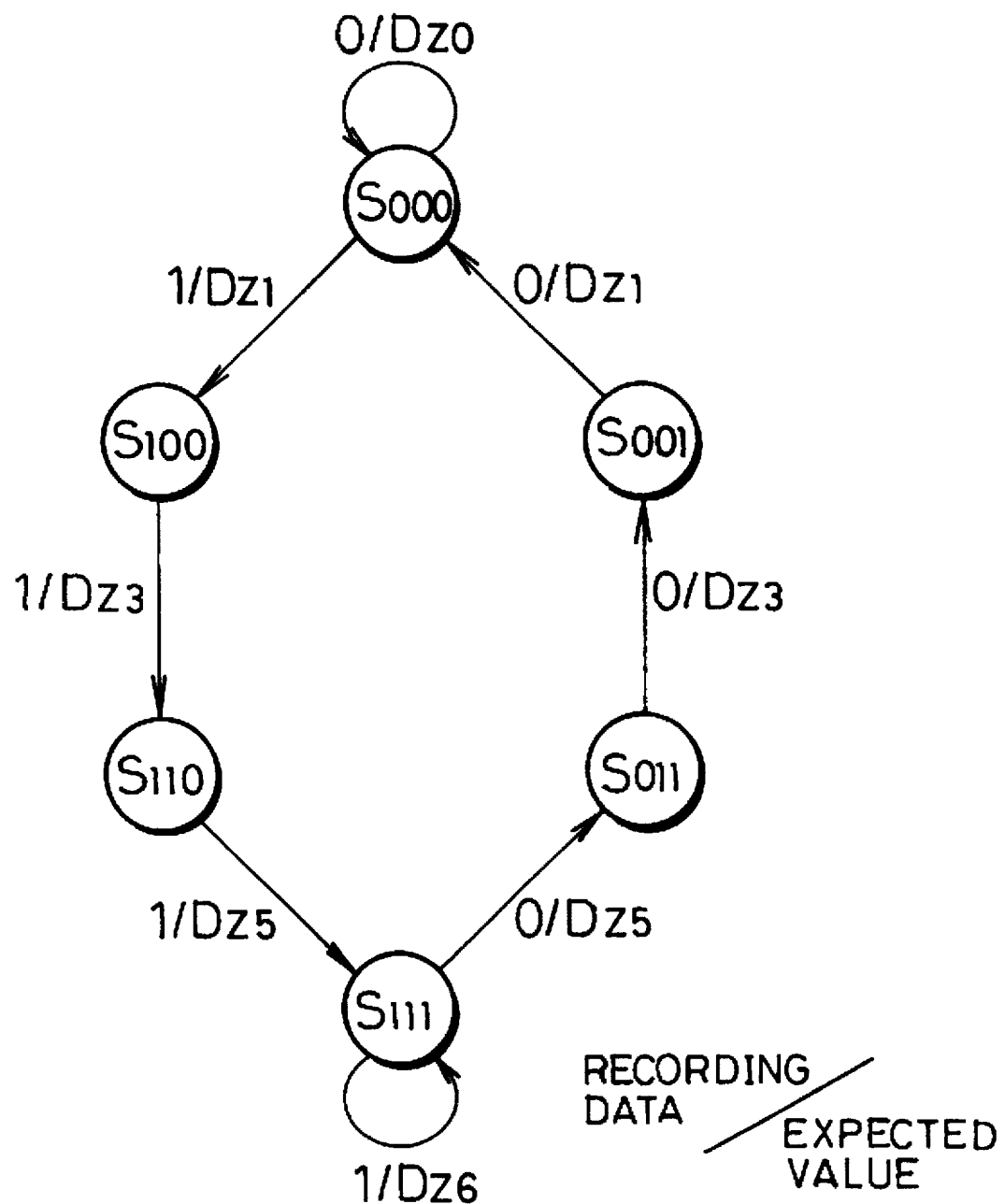
FIG. 28 is a state transition chart of the PR(1,2,2,1) characteristic when the PR(1,2,1) characteristic and the PR (1,2,2,1) characteristic are used together and a characteristic of a recording code that a minimum inverting interval is not less than 3 channel bits is considered.
Figure 29:
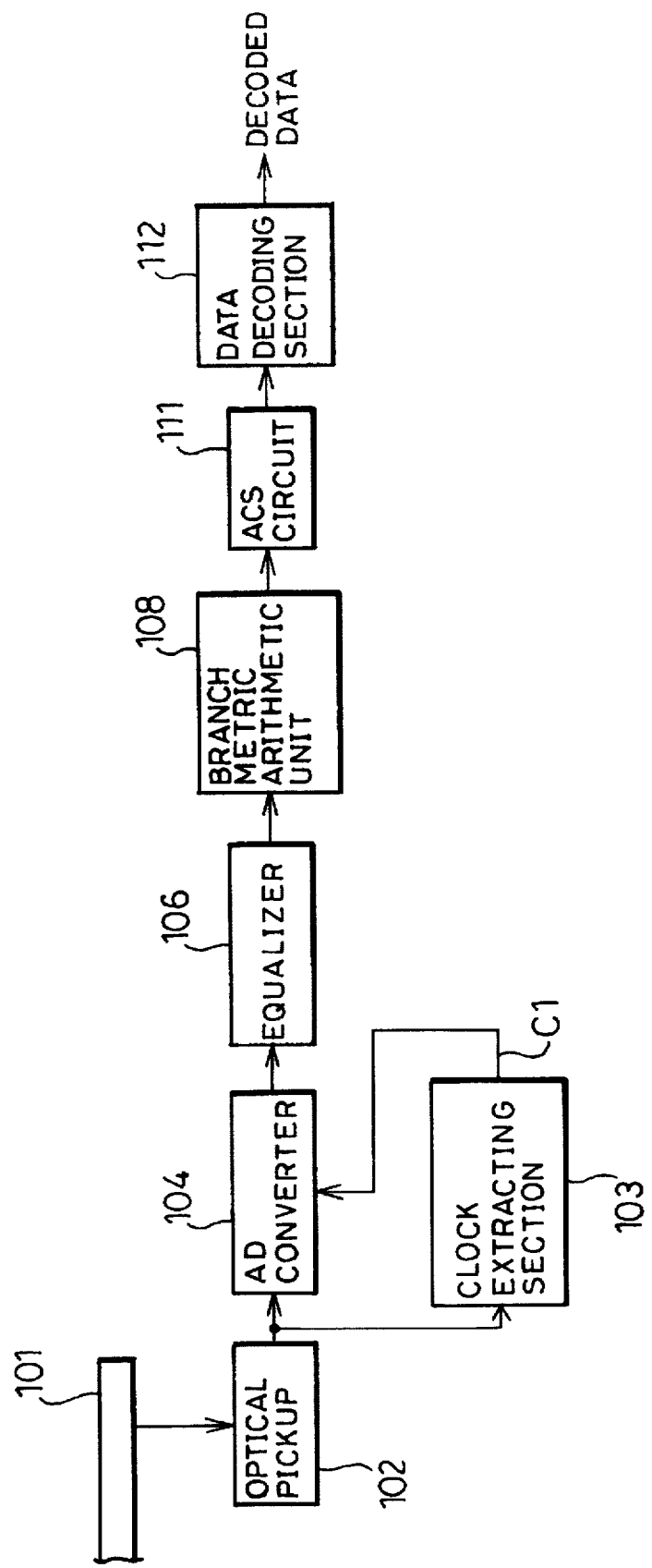
FIG. 29 is a block diagram which shows a configuration of a conventional data detecting circuit.

FIG. 27 is the state transition chart of the PR(1,2,1) characteristic when the PR(1,2,1) characteristic and the PR(1,2,2,1) characteristic are used together and a characteristic of a recording code whose minimal inverting interval is not less than 3 channel bits is considered. FIG. 28 is the state transition chart of the PR(1,2,2,1) characteristic when the PR(1,2,1) characteristic and the PR(1,2,2,1) characteristic are used together and a characteristic of a recording code whose minimal inverting interval is not less than 3 channel bits is considered.

The concrete configuration of the data detecting circuit when characteristics (FIGS. 21 through 28) of the recording codes and each PR characteristic are used together and these characteristics are applied to the present invention is not shown, but it is possible to easily form such a configuration according to the aforementioned descriptions and the state transition charts. In this case, it goes without saying that the data error rate can be lowered at the time of detecting data of a producing signal.

In the above explanation, the case where the minimal inverting interval is 2 channel bits or 3 channel bits is illustrate, but the present invention is not limited to this, so a recording code whose minimal inverting interval is not less than 4 channel bits is also applicable.

In addition, for more concrete explanation, the aforementioned embodiments explains the case where data are oversampled according to a clock with a frequency twice a frequency of a channel clock and are sampled with two different phases. However, also when data are oversampled according to a clock with a frequency n times a frequency of a channel clock and are sampled with different n-numbered phases, the same effects as the aforementioned embodiments can be obtained only by enlarging a dimension into n-numbered dimensions.

In addition, a method of obtaining a plurality of quantized data streams arranged at a distance of channel clock is not limited to the aforementioned method of oversampling data so as to classify the data. For example, a method of quantizing data at each sampling point by one of a plurality of provided AD converters also produces the same effects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data detecting circuit for detecting data from a signal representing a data stream, comprising:

data stream generating means for quantizing and equalizing the signal at sampling points with different phases so as to generate a plurality of data streams having different partial response characteristics;

branch metric generating means for generating branch metrics representing probability of each state transition of the signal based upon the corresponding data stream and the partial response characteristic of the data stream;

branch metric synthesizing means for generating synthetic branch metrics corresponding to each state transition based upon the branch metrics generated by said branch metric generating means; and data decoding means for Viterbi-decoding data based upon each of the synthetic branch metrics.

2. The data detecting circuit according to claim 1, wherein said data stream generating means quantizes and equalizes a reproducing signal read from the recording medium so as to generate a plurality of the data streams.

3. The data detecting circuit according to claim 2, wherein:

said branch metric generating means generates each branch metric based upon a logarithm of a probability density function of each state transition, said branch metric synthesizing means includes an adder for adding the branch metrics, which is received from said branch metric generating means and whose state transition is the same as each other so as to generate a synthetic branch metric corresponding to the state transition.

4. The data detecting circuit according to claim 3, wherein when said branch metric generating means generates the branch metric based upon a difference between $2X \cdot Dx$ and $Dx^2$ where X is a size of the data received from said data stream generating means and Dx is an expected value of the state transition corresponding to the branch metric.

5. The data detecting circuit according to claim 2, further comprising weighting means which is provided correspondingly to at least one of the data streams and weights each branch metric calculated from the data stream according to the partial response characteristic of the data stream.

6. The data detecting circuit according to claim 5, wherein said weighting means includes an multiplier having coefficient according to the weight.

7. The data detecting circuit according to claim 6, wherein said multiplier is provided between said branch metric generating means and said branch metric synthesizing means.

8. The data detecting circuit according to claim 6, wherein when the larger weight of each pair of the data streams is not integral multiplies of the smaller weight, said multipliers are provided correspondingly to the data streams making pairs.

9. The data detecting circuit according to claim 5, further comprising:

detecting means for detecting recording density of the recording medium; and weight changing means for instructing said weighting means to weight a branch metric based upon an instruction of said detecting means.

10. The data detecting circuit according to claim 9, wherein said detecting means includes first detecting means for discriminating a type of the recording medium so as to detect the recording density.

11. The data detecting circuit according to claim 9, wherein said detecting means includes second detecting means for recognizing a position of the recording medium in which the reproducing signal is recorded so as to detect recording density of the recording medium.

12. The data detecting circuit according to claim 9, wherein said weight changing means includes:

storage means for storing a weight to be given from said weighting means according to recording density of a recording medium; and control means for reading out a weight according to the recording density given by the instruction of said detecting means from said storage means so as to instruct the corresponding weighting means in the weight.

13. The data detecting circuit according to claim 2, wherein said data stream generating means includes:

clock generating means for generating a first clock synchronized with the signal, and a second clock having a frequency multiplied by predetermined number a frequency of the first clock;

quantizing means for quantizing the signal at timing of the second clock; and classifying means for classifying data quantized by said quantizing means into a plurality of data streams with a period of the first clock.

14. The data detecting circuit according to claim 2, wherein said data stream generating means includes a finite impulse response filter correspondingly to the data streams.

15. The data detecting circuit according to claim 2, wherein:

said data stream generating means generates a first data stream having a PR(1,1) characteristic and a second data stream having a PR(1,2,1) characteristic, one of said branch metric generating means generates each branch metric from the first data stream by using an expected value according to the PR(1,1) characteristic, the other branch metric generating means generates each branch metric from the second data stream by using an expected value according to the PR(1,2,1) characteristic.

16. The data detecting circuit according to claim 2, wherein:

said data stream generating means generates a first data stream having a PR(1,2,1) characteristic and a second data stream having a PR (1,2,2,1) characteristic, one of said branch metric generating means generates each branch metric from the first data stream by using an expected value according to the PR(1,2,1) characteristic;

the other branch metric generating means generates each branch metric from the second data stream by using an expected value corresponding to the PR(1,2,2,1) characteristic.

17. The data detecting circuit according to claim 2, wherein said branch metric generating means generates each branch metric by setting possibility of state transition, which represents inversion at a shorter interval than a minimal inverting interval of the signal in each state transition, to 0.

18. The data detecting circuit according to claim 2, wherein the recording medium is an optical disk.

19. The data detecting circuit according to claim 1, wherein:

said branch metric generating means generates each branch metric based upon a logarithm of a probability density function of each state transition, said branch metric synthesizing means includes an adder for adding the branch metrics, which is received from said branch metric generating means and whose state transition is the same as each other so as to generate a synthetic branch metric corresponding to the state transition.

20. The data detecting circuit according to claim 19, wherein when X is a size of the data received from said data stream generating means and Dx is an expected value of the state transition corresponding a branch metric, said branch metric generating means generates the branch metric based upon a difference between $2X \cdot Dx$ and $Dx^2$.

21. The data detecting circuit according to claim 1, further comprising weighting means for weighting each branch metric calculated from the data streams according to partial response characteristics of the data streams, said weighting means being provided correspondingly to at least one data stream.

* * * * *